(12) United States Patent
Standaar et al.

(10) Patent No.: US 10,893,773 B2
(45) Date of Patent: Jan. 19, 2021

(54) UNIT, DEVICE AND SYSTEM FOR PREPARING BEVERAGE CONSUMPTIONS

(71) Applicant: Koninklijke Douwe Egberts B.V., Utrecht (NL)

(72) Inventors: Koen Standaar, Utrecht (NL); Hendrik Johan Dees, Utrecht (NL); Mathias Antonius Fransiscus Rutten, Utrecht (NL); Bram Klabbers, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 723 days.

(21) Appl. No.: 15/621,784

(22) Filed: Jun. 13, 2017

(65) Prior Publication Data

US 2017/0347829 A1 Dec. 7, 2017

Related U.S. Application Data

(63) Continuation of application No. PCT/EP2015/079886, filed on Dec. 15, 2015.

(30) Foreign Application Priority Data

Dec. 15, 2014 (NL) .................................... 2013987

(51) Int. Cl.
*A47J 31/40* (2006.01)
*A47J 31/46* (2006.01)

(52) U.S. Cl.
CPC ............. *A47J 31/407* (2013.01); *A47J 31/40* (2013.01); *A47J 31/401* (2013.01); *A47J 31/404* (2013.01); *A47J 31/461* (2018.08); *A47J 31/469* (2018.08)

(58) Field of Classification Search
CPC ........ A47J 31/40; A47J 31/401; A47J 31/404; A47J 31/407; A47J 31/461; A47J 31/469;
(Continued)

(56) References Cited

U.S. PATENT DOCUMENTS 3,682,090 A 8/1972 Meriggi
3,827,467 A * 8/1974 Henley .................... B67D 3/00
141/104

(Continued)

FOREIGN PATENT DOCUMENTS

AU 2003238718 A1 12/2002
CH 675312 A5 9/1990
(Continued)

OTHER PUBLICATIONS

Translation of Chinese Office Action and Search Report, App. No. 2015800753051 (dated Feb. 25, 2019).
(Continued)

*Primary Examiner* — Dana Ross
*Assistant Examiner* — Joe E Mills, Jr.
(74) *Attorney, Agent, or Firm* — Fitch, Even, Tabin & Flannery LLP

(57) ABSTRACT

The beverage preparation unit comprises a mixing chamber having a beverage outlet, a liquid flow path for supplying a liquid to the mixing chamber, and an air flow path for supplying air to the liquid flow path. The mixing chamber is arranged for receiving a beverage related ingredient, such as concentrate, preferably from an exchangeable supply pack. The liquid flow path is arranged for generating a hollow jet of liquid having an outer liquid portion extending in a flow direction of the jet and an inner air portion extending in a flow direction of the jet wherein the outer liquid portion surrounds the inner air portion.

33 Claims, 19 Drawing Sheets

(58) Field of Classification Search
CPC ...... A47J 31/405; A47J 31/41; A47J 31/4403;
A47J 31/46; A47J 31/467; B67D 1/0005;
B67D 1/003; B67D 1/004
USPC ...................................................... 99/289 R
See application file for complete search history.

(56) References Cited

U.S. PATENT DOCUMENTS

| | | | |
|---|---|---|---|
| 3,884,391 | A | 5/1975 | Pauliukonis |
| 4,015,749 | A | 4/1977 | Arzberger et al. |
| 4,947,738 | A | 8/1990 | Eugster |
| 6,682,047 | B1 | 1/2004 | Piscaer et al. |
| 7,178,452 | B2 | 2/2007 | Fischer |
| 8,444,016 | B2 | 5/2013 | Lussi |
| 8,646,380 | B2 | 2/2014 | Mueller |
| 9,095,154 | B2 | 8/2015 | Anliker et al. |
| 2004/0227123 | A1 | 11/2004 | Rodgers et al. |
| 2007/0272317 | A1 | 11/2007 | Klopfenstein et al. |
| 2008/0029541 | A1 | 2/2008 | Wallace et al. |
| 2009/0108224 | A1 | 4/2009 | Clasen et al. |
| 2009/0145926 | A1 | 6/2009 | Klopfenstein et al. |
| 2009/0214742 | A1 | 8/2009 | Peden et al. |
| 2010/0126354 | A1 | 5/2010 | Mahlich |
| 2010/0162901 | A1 | 7/2010 | Mahlich |
| 2010/0176155 | A1 | 7/2010 | Baron et al. |
| 2010/0193544 | A1 | 8/2010 | Rusch et al. |
| 2011/0146500 | A1 | 6/2011 | Boussemart et al. |
| 2011/0305807 | A1* | 12/2011 | Koeling ............. A47J 31/407 426/431 |
| 2012/0161046 | A1 | 6/2012 | Tsai |
| 2015/0102062 | A1* | 4/2015 | Mosimann ........... A47J 31/467 222/129.1 |
| 2015/0157166 | A1 | 6/2015 | Van Os et al. |

FOREIGN PATENT DOCUMENTS

| | | |
|---|---|---|
| CN | 1674815 A | 9/2005 |
| CN | 101835414 A | 9/2010 |
| CN | 102137610 A | 7/2011 |
| DE | 21 60 501 A1 | 6/1973 |
| DE | 42 35 262 A1 | 4/1994 |
| DE | 44 27 745 A1 | 2/1996 |
| DE | 19503618 C1 | 8/1996 |
| DE | 20 2008 007 131 U1 | 10/2009 |
| EP | 0 307 497 A1 | 3/1989 |
| EP | 0 409 305 A2 | 1/1991 |
| EP | 2 011 421 A1 | 1/2009 |
| EP | 2 030 538 A2 | 3/2009 |
| EP | 2 924 326 A1 | 9/2015 |
| JP | 5615993 B1 | 10/2014 |
| WO | WO-85/05167 A1 | 11/1985 |
| WO | WO-00/45073 A1 | 8/2000 |
| WO | WO-02/100224 A2 | 12/2002 |
| WO | WO-2007/120045 A2 | 10/2007 |
| WO | WO-2008/143505 A1 | 11/2008 |
| WO | WO-2008/147195 A1 | 12/2008 |
| WO | WO-2009/018672 A1 | 2/2009 |
| WO | WO-2011/037464 A1 | 3/2011 |
| WO | WO-2014/003570 A2 | 1/2014 |
| WO | WO-2014/081037 A1 | 5/2014 |
| WO | WO-2014/191217 | 12/2014 |

OTHER PUBLICATIONS

International Search Report and Written Opinion, PCT/EP2015/079886, Koninklijke Douwe Egberts B.V., 9 pages (dated Mar. 9, 2016).

English-language translation of Japanese Office Action, App. No. 2017-531889, 11 pages (dated Dec. 3, 2019).

* cited by examiner

UNIT, DEVICE AND SYSTEM FOR PREPARING BEVERAGE CONSUMPTIONS

CROSS-REFERENCE TO RELATED APPLICATIONS

This application is a continuation of PCT/EP2015/079886, filed Dec. 15, 2015, which claims the benefit of and priority to Netherlands Application No. NL2013987, filed Dec. 15, 2014, the entire contents of all of which are incorporated herein by reference.

BACKGROUND

The invention relates to a system for preparing beverage consumptions from a beverage related ingredient for example concentrate. Examples of beverage related concentrates are coffee concentrate, cocoa concentrate, tea concentrate and milk concentrate. Such systems are provided with a mixing chamber, liquid supply means for supplying a liquid such as water to the mixing chamber, and means for supplying a beverage related ingredient, such as concentrate to the mixing chamber. Additionally the system may include means for supplying air to the mixing chamber in order to produce beverage consumptions with a foam layer.

Such systems are known in the art. In systems where a beverage related ingredient is mixed with a liquid in a mixing chamber the mixing chamber and liquid and/or ingredient supply means may become soiled with residues from the mixture. The mixture residue may eventually cause the system to clog, and/or may even result in undesired bacterial growth. Additionally consumers are becoming ever more critical with regard to the appearance of the produced beverage consumptions. This is especially true for systems where a beverage related ingredient, such as concentrate, is mixed with a liquid, such as water, in a mixing chamber.

SUMMARY

Therefore it is an object of the invention to provide an improved system for preparing beverage consumptions. Additionally, and/or alternatively, it is an object of the invention to provide a system with improved hygiene. Additionally, and/or alternatively, it is an object of the invention to provide a system the produces beverage consumptions with an improved foam layer.

Thereto according to the invention a system for preparing beverage consumptions such as coffee, tea, cappuccino, lungo, expresso, etc. is provided. The system comprises a beverage preparation device, and at least one exchangeable supply pack arranged for holding a beverage related ingredient. The beverage related ingredient may be a concentrate. Examples of beverage related concentrates are coffee concentrate, cocoa concentrate, tea concentrate and milk concentrate. The beverage preparation device comprises a mixing chamber having a beverage outlet, liquid supply means including a liquid flow path for supplying a liquid, for example water under pressure, to the mixing chamber, air supply means for supplying air to the liquid flow path, and a drive shaft. The at least one exchangeable supply pack includes a container for holding a beverage related ingredient, and a doser having an outlet. The doser is arranged for supplying the beverage related ingredient from the container to the outlet of the doser in a dosed manner. The at least one exchangeable supply pack and the beverage preparation device are mechanically connectable. When connected, the outlet of the doser is brought in fluid communication with the mixing chamber and the drive shaft of the beverage preparation device is arranged for transmitting torque from the beverage preparation device to the doser such that when the drive shaft is activated beverage related ingredient is supplied from the outlet of the doser into the mixing chamber. The mixing chamber is provided with a supply opening for receiving concentrate from the doser of the at least one exchangeable supply pack. For example the supply opening may be located towards a top of the mixing chamber such that the beverage related ingredient may flow from the outlet of the doser into the mixing chamber substantially under the influence of gravity. When the supply opening is located towards the top of the mixing chamber, a functional height can be defined as the bottom of the mixing chamber to the level of the mixing chamber where the doser outlet is located. The functional height is in the range of 15 mm-100 mm, preferably 20 mm-80 mm, and more preferably 20 mm-40 mm. It will be appreciated that the functional height of the mixing chamber is the height of the mixing chamber in which the beverage may be mixed. The functional height is delimited by the doser and the outlet of the mixing chamber.

It will be appreciated that a drive shaft is one example of a doser interface for activating the doser for supplying beverage related ingredient from the outlet of the doser into the mixing chamber.

Optionally, the beverage preparation device is arranged to rotate the drive shaft at X RPM wherein X lays in the range of 20-5000 and preferably in the range of 50-2200, wherein the doser is arranged such that if the doser is driven with X RPM, the doser doses the ingredient with C*X/60 ml/sec wherein C lays in the range of 0.05-1 and preferably in the range of 0.1-0.3. C is the volume of beverage related ingredient per revolution of the drive shaft. It has been found that this relationship between the revolutions per minute of the drive shaft and the amount of ingredient dosed by the doser produces beverage consumptions with the desired strength and flavor.

Optionally, the system is arranged such that, in use for the preparation of a beverage the torque which is applied by the drive shaft to the doser lays in the range of 0.1-0.8 Nm, and preferably in the range of 0.15-0.45 Nm. It has been found that transmitting torque from the drive shaft to the doser in the above ranges results in the desired dosing.

Optionally, the beverage preparation device is arranged to dose Z ml of liquid for the one beverage into the mixing chamber wherein Z lays in the range of 2-10000, and preferably in the range of 10-300, and wherein the system is arranged to dose Y ml beverage related ingredient into the mixing chamber for the preparation of one beverage wherein Y lays in the range of 0.1-5000, and preferably in the range of 1-100. It has been found that when the device doses the above range of liquid to the mixing chamber, it is desirable that the system doses the above range of beverage related ingredient to the mixing chamber in order to consistently produce beverage consumptions with the desired strength and flavor.

Optionally, the beverage preparation device is arranged to dose Z ml of liquid into the mixing chamber for the one beverage wherein Z lays in the range of 2-10000, and preferably in the range of 10-300, and wherein the system is arranged to dose D*Z ml beverage related ingredient into the mixing chamber for the preparation of one beverage wherein D lays in the range of 0.02-0.5, and preferably in the range of 0.04-0.3. D is the ratio of the volume of beverage related ingredient to volume of liquid for preparing one beverage. It has been found that this relationship between the amount of liquid dosed to the mixing chamber, and the beverage related ingredient dosed by the system consistently produces beverages with the desired strength and flavor.

Optionally, the beverage preparation device is arranged such that for preparation of the one beverage the liquid is dosed to the mixing chamber on average with Q ml/sec wherein Q lays in the range of 5-30 and preferably in the range of 8-12, and wherein the system is arranged such that for the preparation of the one beverage the ingredient is dosed into the mixing chamber on average with R ml/sec wherein R lays in the range of 0.1-15, and preferably in the range of 0.32-3.6. R is the flow of beverage related ingredient to the mixing chamber. It has been found that with device flows rates in the ranges above, it is desirable that the system doses the beverage related ingredient in the above ranges in order to produce a beverage with the desired strength and flavor consistently.

Optionally, the beverage preparation device is arranged such that for preparation of the one beverage the liquid is dosed to the mixing chamber on average with Q ml/sec wherein Q lays in the range of 5-30 and preferably in the range of 8-12, and wherein the system is arranged such that for the preparation of the one beverage the ingredient is dosed into the mixing chamber on average with F*Q ml/sec wherein F lays in the range of 0.02-0.5 and preferably in the range of 0.04-0.3. F is the ratio of beverage related ingredient flow to liquid flow for preparing one beverage. It has been found that this relationship between the liquid dose rate and the beverage related ingredient dose rate produces a beverage with the desired strength and flavor.

Optionally, the beverage preparation device is arranged such that for the preparation of the one beverage the liquid is dosed in the form of a jet into the mixing chamber wherein the jet on average has a speed of V m/sec wherein V lays in the range of 4-30, and preferably in the range of 6-20. It has been found that jets having on average a speed in the above ranges promotes mixing of the liquid and the beverage related ingredient and may improve foam production.

Optionally, the beverage preparation device is arranged such that if for the preparation of the one beverage the liquid is dosed in the form of a jet into the mixing chamber with Q ml/sec, wherein preferably Q lays in the range of 5-30 and preferably in the range of 8-12, the speed of the jet is Q/E wherein E is the cross-surface area of the liquid of the jet in $mm^2$ wherein E lays within the range of 0.17-7.5, and preferably in the range of 0.4-2. It has been found that the above relationship between the flow rate of liquid to the mixing chamber and the speed of the jet promotes mixing while producing a beverage consumption in an acceptable amount of time.

Optionally, the beverage preparation device is arranged such that for the preparation of the one beverage the liquid is dosed to the mixing chamber during G seconds wherein G lays in the range of 0.5-10000, and preferably in the range of 1-30. It has been found that the above ranges produce beverage consumptions in an acceptable amount of time.

Optionally, the liquid supply means is arranged for supplying liquid to the mixing chamber at a flow rate of 5-30 ml/sec, and preferably 8-12 ml/sec. It has been found that such flow rates produce beverage consumptions in an acceptable amount of time.

Optionally, the liquid supply means is arranged for generating a jet of liquid having a stable speed of 4-30 m/sec and preferably 6-20 m/sec. It will be appreciated that stable speed is the speed of the jet when the liquid supply means have reached a stable state. The liquid supply means may, for example, have a ramp up state where a jet of liquid is produced before reaching a stable state. There may also be a ramp down state when the liquid supply means is disable. It has been found that jets having stable speeds in abovementioned ranges promote mixing of the beverage related ingredient as well as foam production. In addition, jets having stable speeds in the abovementioned ranges may improve hygiene.

Optionally, the beverage preparation device and the doser of the at least one exchangeable supply pack are arranged for supplying beverage related ingredient, for example concentrate, to the mixing chamber at a rate of 0-14 ml/sec, and preferably 0-7 ml/sec. It has been found that such flow rates produce beverage consumptions in an acceptable amount of time.

Optionally, during a beverage cycle for preparing a beverage consumption, the beverage preparation device is arranged for activating the drive shaft for 0.5-1000 seconds, preferably 0.5-30 seconds.

Optionally, during a beverage cycle for preparing a beverage consumption, the doser is arranged for dosing 0.1-5000 ml of beverage related ingredient when the drive shaft is activated for 0.05-1000 seconds. Optionally, during preparation of a beverage consumption, the doser is arranged for dosing 1-100 ml of beverage related ingredient when the drive shaft is activated for 0.5-30 seconds. It has been found that exchangeable supply packs having dosers that supply the above ranges of beverage related ingredient when activated by the beverage preparation device for the above ranges provide beverage consumptions with the desired strength and flavor within a desired amount of time. The desired amount of time, may be driven by the configuration of the liquid supply means or even by what the consumer finds to be an acceptable amount of time to wait for the beverage consumption.

Optionally, the doser is arranged for dosing 0.05-1.0 ml of beverage related ingredient per drive shaft revolution, and preferably 0.1-0.3 ml of beverage related ingredient per drive shaft revolution. This relationship has been found to meet system and consumer demands.

Optionally, the beverage preparation device is arranged for operating the drive shaft, during activation, at substantially 20-5000 revolutions per minute, and preferably 50-2200 revolutions per minute (RPM). It will be appreciated that the operation of the drive shaft may have a ramp up phase, where the revolutions per minute are lower than a target number of revolutions per minute. For example, if driven by a stepper motor, the motor may start at a first RPM. During a ramp up phase, the RPM of the motor may be incrementally increased, for example every 50 msec, until the target RPM is reached.

Optionally, during a beverage cycle for preparing a beverage consumption, the doser is arranged for dosing 1-100 ml of beverage related ingredient when the drive shaft is activated for 0.5-30 seconds at substantially 50-2200 revolutions per minute. Optionally, during preparation of a beverage consumption, the doser is arranged for dosing 0.1-5000 ml of beverage related ingredient when the drive shaft is activated for 0.05-1000 seconds at substantially 20-5000 revolutions per minute. The above ranges have been found to produce beverage consumptions having desired characteristics such as strength and flavor in an acceptable amount of time.

Optionally, the beverage preparation device is arranged for operating the drive shaft, during activation, in order to transmit torque to the doser greater than 0.05 Nm, preferably greater than 0.1 Nm, and most preferably greater than 0.2 Nm. It has been found that it is desirable if a predetermined amount of torque is required to be transmitted from the drive shaft to the doser in order to activate the doser. This may improve accuracy.

Optionally, during a beverage cycle for preparing a beverage consumption, the doser is arranged for dosing 1-100 ml of beverage related ingredient when the drive shaft is activated for 0.5-30 seconds at substantially 50-2200 revolutions per minute and wherein the drive shaft transmits more than 0.2 Nm of torque to the doser. It has been found that in these conditions a desired beverage consumption is produced in a desired amount of time.

Optionally, during a beverage cycle for preparing a beverage consumption, the beverage preparation device is arranged for activating the liquid supply means for a period of 0.5-1000 seconds, and preferably 1-30 seconds. Optionally, during a beverage cycle for preparing a beverage consumption, the beverage preparation device is arranged for activating the liquid supply means for a period of 0.5-1000 seconds, and preferably 1-30 seconds, and wherein during the period of activation of the liquid supply means, the beverage preparation device is further arranged for activating the drive shaft such that 0.1-5000 ml, and preferably 1-100 ml of beverage related ingredient is supplied from the outlet of the doser to the mixing chamber. This results in 5-10000 ml of drink volume and preferably 15-300 ml of drink volume. In this way the system can also produce a range of beverage volumes, while maintaining beverage quality.

Optionally, the mixing chamber has a volume of 1-20 ml, preferably 2-8 ml, and most preferably 4-5 ml. It has been found that for the operating ranges of the system, such as liquid supply means, drive shaft and doser, this volume range of the mixing chamber produces a beverage consumption having the desired characteristics. These volume ranges may also promote foam formation.

Optionally, during a beverage cycle for preparing a beverage consumption, the beverage preparation device is arranged for activating the liquid supply means for a first period of time and for activating the drive shaft for a second period of time, wherein the first period of time and the second period of time overlap. Optionally, during the first period, the liquid supply means is arranged for supplying 2-10000 ml of liquid, and preferably 10-290 ml of liquid, and wherein the doser is arranged for supplying 0.1-5000 ml of beverage related ingredient, and preferably 1-100 ml of beverage related ingredient during the activation of the drive shaft for the second period of time. It has been found that these supply ranges produce a desired beverage consumption in a desired amount of time.

Optionally, the first period begins 0-1 seconds before the second period. Activating the liquid supply means prior to activating the drive shaft in order to drive the doser and supply beverage related ingredient to the mixing chamber may promote better mixing. Optionally, during a beverage cycle, the beverage preparation device is arranged for activating the liquid supply means prior to activating the drive shaft for driving the doser of the at least one exchangeable supply pack, and wherein preferably the drive shaft is activated 0-1 seconds after activation of the liquid supply means.

Optionally, wherein the second period ends 0-5 seconds, and preferably 0-3 seconds before the first period ends. In this way, the liquid supply means remains activate, at the end of a beverage cycle, after the device stops driving the doser. This has been found to promote hygiene, as the prolonged activation of the liquid supply means rinses the mixing chamber.

Optionally, at the end of a beverage cycle, the beverage preparation device is arranged for activating the liquid supply means after the beverage preparation device has stopped activation of the drive shaft. Conceivably, the liquid supply means may be continued to be activated, or alternatively be reactivated, at the end of the beverage cycle. Again this has been found to promote hygiene and reduce mixture residue build up.

In this case it is desirable that the beverage preparation device is arranged for activating the liquid supply means after the beverage preparation device has stopped activation of the drive shaft for a period of 0-5 seconds, and more preferably 0-3 seconds.

Optionally, at the end of the beverage cycle, the beverage preparation device is arranged for activating the liquid supply means after the beverage preparation device has stopped activation of the drive shaft such that 5-30 ml and preferably 8-15 ml of water are supplied to the mixing chamber. This amount of liquid has been found to sufficiently rinse the mixing chamber especially, when the mixing chamber has a volume of 1-20 ml, preferably 2-8 ml, and most preferably 4-5 ml. In addition to rinsing the mixing chamber, this amount of liquid causes the mixing chamber to fill and rinses the fluid connection between the outlet of the doser and the mixing chamber. Preferably, the mixing chamber is tapered such that diameter widens in an upward vertical direction, and wherein liquid supplied by the liquid supply means after the beverage preparation device has stopped activation of the drive shaft is directed upwardly by the tapered mixing chamber such that the liquid level rises in the mixing chamber and cleans the outlet of the doser, and in particular cleans an outlet valve of the doser. Optionally, the beverage preparation device is arranged for activating the liquid supply means such that 5-30 ml and preferably 8-15 ml of water are supplied to the mixing chamber, and during activation of the liquid supply means the beverage preparation machine does not activate the drive shaft. As mentioned above, this amount of liquid has been found to sufficiently rinse the mixing chamber and the fluid connection between the outlet of the doser and the mixing chamber, including an outlet of the doser. In this way a cleaning cycle may be performed independent of a beverage cycle. For example, a cleaning cycle may be performed at any preprogrammed time.

Optionally, the doser comprises a pump assembly including a pump channel between an inlet and an outlet for receiving the beverage related ingredient from the container of said pack and for pumping the ingredient to the outlet.

Optionally, the pump assembly further comprises a pump chamber and at least two mutually engaging gears forming a gear pump arranged in said pump chamber, wherein at least one of said gears forms a driving gear, the driving gear comprising a shaft opening for receiving the drive shaft of the beverage preparation device for operating the gear pump.

Optionally, the shaft opening coincides with an axle reception opening of a support wall of the pump chamber, and wherein a flexible seal is arranged at least between the driving gear and the support wall, wherein the seal comprises a through opening coinciding with the shaft opening and the axle reception opening for receiving the driving axle. This doser has been found to work well in such a system.

Optionally, the liquid supply means is arranged for supplying the liquid into the mixing chamber in the form of a jet.

Optionally, the liquid flow path includes a first nozzle and the liquid flow path is arranged for generating a hollow jet of liquid having an outer liquid portion extending in a flow direction of the jet and an inner air portion extending in a flow direction of the jet wherein the outer liquid portion surrounds the inner air portion. In this way the hollow jet has the form of a straw wherein the inner side of the straw represents the inner air portion of the jet and the straw itself represents the outer liquid portion of the jet. Thus the hollow jet in fact is a combination of an jet of air and a hollow jet of liquid which surrounds the jet of air. The flow direction of the jet of air and the flow direction of the hollow jet of liquid is the same. It has been found that a hollow jet is a effective manner to supply both liquid and air to the mixing chamber. Optionally, the first nozzle has an tapered geometry wherein over the flow direction of the nozzle, the opening of the nozzle decreases exponentially.

In this way a beverage preparation unit for preparing beverage consumptions using a beverage related ingredient is provided. The beverage preparation unit comprises a mixing chamber having a beverage outlet, a liquid flow path for supplying a liquid to the mixing chamber; and an air flow path for supplying air to the liquid flow path the mixing chamber is arranged for receiving a beverage related ingredient, such as concentrate, preferably from an exchangeable supply pack. The liquid flow path is arranged for generating a hollow jet of liquid having an outer liquid portion extending in a flow direction of the jet and an inner air portion extending in a flow direction of the jet wherein the outer liquid portion surrounds the inner air portion. Optionally, the liquid flow path and the air flow path are arranged for forming the hollow jet. The hollow jet is formed through the interaction and/or cooperation of the liquid flow path and the air flow path.

In one possible embodiment the flow of liquid in the liquid flow path extends in an axial direction, wherein the system is further provided with air injection means for generating a flow of air which extends in the axial direction and for injecting the flow of air substantially coaxially in the flow of liquid in the flow path (meaning that an axial axe of the flow of liquid in the flow path coincides with an axial axe of the flow of air) wherein the flow direction of the flow of liquid in the flow path is the same as the flow direction of the flow of air so as to obtain the hollow jet.

Thus it may hold that the jet which is (finally) generated comprises an axial direction, wherein the system is further provided with air injection means for generating a flow of air which extends in the axial direction and for injecting the flow of air substantially coaxially in the jet wherein the flow direction of the jet is the same as the flow direction of the flow of air so as to obtain the hollow jet.

Thus it may hold that the jet which is (finally) generated extends in an axial direction of the jet, wherein the system is further provided with air injection means for generating a flow of air and injecting the flow of air substantially coaxially in the jet wherein the flow direction of the jet is the same as the flow direction of the flow of air so as to obtain the hollow jet.

Optionally, the injection means comprise a needle having an open end wherein an axial direction of the needle and an the axial direction of the jet at least substantially coincide. Preferably the length of a portion of the needle extending along the axial direction in the liquid flow path is in the range of 1 mm-10 mm, preferably in the range of 2.5 mm-5 mm, and more preferably in the range of 3 mm-4.5 mm.

Optionally, the open end of the needle is located near the first nozzle wherein the needle extends from the open end in a direction opposite to the flow direction of the jet.

Optionally, the open end of the needle is located in the nozzle, stream upwards of the nozzle or stream downwards of the nozzle. Preferably the open end of the needle is spaced between 0 mm-5 mm, preferably 0 mm-2 mm, most preferably 0 mm-0.5 mm from the opening of the nozzle. Optionally, the inner diameter of the needle is between 0.1 mm and 0.5 mm.

Optionally, the first nozzle is arranged for generating a jet of liquid in an axial direction, and wherein the liquid flow path includes air injection means for injecting a stream of air towards a center of the jet of liquid in a direction substantially coaxial with the axial direction of the jet of liquid such that a hollow jet is formed.

Optionally, the air injection means include a pipe extending into the first nozzle, wherein the pipe is substantially coaxial with the first nozzle, and wherein the air injection means is arranged for injecting air into the jet of liquid generated by the first nozzle through the pipe.

Optionally, the air injection means is arranged to be in fluid communication with an air pump.

Optionally, the liquid flow path includes a selection valve comprising a valve body, a liquid inlet, an air inlet, and at least a first outlet. It will be appreciated that by includes it is intended that the liquid flow path runs through the valve. The liquid inlet is in fluid communication with the liquid supply means. The air inlet is in fluid communication with the air supply means. The at least first outlet is in fluid communication with the mixing chamber. The selection valve further comprises a selector member including a portion of the air injection means, for example the needle. The selector member is movably mounted with respect to the valve body for movement from a first position in which the liquid inlet is in fluid communication with the at least first outlet, and wherein the air inlet is in fluid communication with the at least first outlet via the needle of the selector member. In this way a hollow jet may be generated with the selection valve. Preferably the selector member is slidably mounted such that portions of valve elements may slide in and out of the liquid flow path. Preferably, the first nozzle is located downstream of the selector member. More preferably, the first nozzle is included in the valve. Preferably the selector is movable is a direction perpendicular to the flow of the liquid into the mixing chamber. Preferably, the selector is movable is a direction that is perpendicular to that of an axial axe of the flow of liquid in the flow path that coincides with an axial axe of the flow of air. In this way movement of the selector is perpendicular to the flow direction of the flow of liquid in the flow path which is the same as the flow direction of the flow of air for obtaining the hollow jet. Preferably movement of the selector is a rotational movement in the plane substantially perpendicular to the flow of liquid to the mixing chamber.

Optionally, the selector member comprises a ceramic element, preferably shaped as a disc, and provided with an opening, wherein the needle extends axially within the opening. In this way liquid from the liquid inlet and liquid supply means may flow around the needle with a liquid flow path extending in an axial direction. The needle provides air injection means for generating a flow of air which extends in the axial direction and for injecting the flow of air substantially coaxially in the flow of liquid in the flow path. This forms a hollow jet, which subsequently flows through the first nozzle and exits the valve via the at least first outlet and into the mixing chamber.

Optionally, the selector member is movable to a second position in which the liquid inlet is in fluid communication with the at least first outlet. In the second position, fluid communication from the air inlet to the at least first outlet is shut off. It will be appreciated that in the second position a fluid connection between the air inlet and the at least first outlet is not formed or is no longer formed, i.e. it is blocked, for example by the selector member. In this way, the selection valve incorporates an air valve for selectively supplying air to the needle for forming a hollow jet.

Optionally, the selector member is movable to a third position in which fluid communication from the liquid inlet to the at least first outlet is shut off. In this position fluid communication from the air inlet to the at least first outlet is shut off, is not formed, no longer formed, or it is blocked, for example by the selector member. In this way the pressure in from the liquid supply means of the device may be maintained if for example a plurality of, for example two, beverage preparation units were provided in the beverage preparation device. For, example one unit may be provided for a coffee related beverage ingredient and another unit may be provided for a milk related beverage ingredient. When a coffee beverage without milk is being produced the milk beverage preparation unit may be placed in the third position such that pressure of the liquid supply means may be maintained.

Optionally, the valve has a second outlet in fluid communication with a reservoir of the system. The selector member is movable to a fourth position wherein the liquid inlet is in fluid communication with the second outlet. In this position preferably fluid communication from the liquid inlet to the at least one outlet and fluid communication from the air inlet to the at least first outlet is shut off. The second outlet is a bypass outlet. This position is useful for preventing boiler pressure buildup and to allow removal of air from the boiler at the beginning of the drink production process.

Optionally, the valve further includes a satellite element including the first nozzle. The satellite member is associated with the selector member, and the satellite element has a predefined limited amount of free relative movement with respect to the selector member. Therefore the satellite element may be positioned independently of the selector member. However preferably the satellite member is movable is the same direction as the selector member. In the first position the liquid inlet and air inlet are in fluid communication through a fluid flow path including the first nozzle of the satellite member. It will be appreciated that the fluid flow path comprises the first nozzle and that it is not limited to only the first nozzle. For example the fluid flow path may include the air inlet and needle as well as the liquid inlet and the opening around the needle for allowing water to flow axially along the needle to the point where air is injected.

Optionally, the satellite element is further provided with an additional nozzle of a different geometry than that of the first nozzle. In the second position, the liquid inlet is in fluid communication with the at least first outlet through a fluid flow path including the additional nozzle. By allowing different nozzles of the satellite element to form the fluid flow path different beverages may be brewed.

Optionally, the selector member is provided with a second opening remote from the first opening. Preferably, in the second position, the liquid inlet is in fluid communication with the at least first outlet through a fluid flow path including the second opening.

In one example the additional nozzle is the substantially the same diameter as an opening forming the at least first outlet. With the fluid flow path including the second opening in the selector member, also chosen to be substantially the same diameter as the opening forming the at least first outlet, a fluid flow path may be formed for generating a solid jet having a relatively larger diameter. Such a jet is useful for forming foamless beverages.

When the valve is in the third position, the at least first outlet may be vented. This advantageously allows the mixing chamber to drain. If a satellite element is provided the vent may be provided by a channel in the satellite element.

In another possible embodiment the liquid flow path includes the first nozzle which is arranged for generating a hollow jet of liquid having an outer liquid portion extending in a flow direction of the jet and an inner air portion extending in a flow direction of the jet wherein the outer liquid portion surrounds the inner air portion.

Optionally, the first nozzle terminates at a side wall of the mixing chamber, and wherein the outer liquid portion of the jet contacts a substantial portion of an inner surface of the first nozzle in an area adjacent to the mixing chamber. In this way the outer liquid portion of the jet sealingly contacts most of an inner surface of the first nozzle in the area adjacent to the mixing chamber. This prevents beverage related ingredient from flowing out of the mixing chamber and into the liquid flow path. In this way mixture residue buildup may be reduced.

Optionally, the first nozzle tapers towards the mixing chamber, and wherein the liquid flow path comprises a second nozzle located upstream from the first nozzle and arranged for generating a substantially solid jet of liquid, wherein the nozzles are positioned relative to each other such that the substantially solid jet of liquid, is at least surrounded partially by air, and impacts an inner surface of the first nozzle in an impact zone causing the jet to swirl around the inner surface of the first nozzle thus forming a hollow jet of liquid. Preferably, the first and second nozzle are positioned relative to each other such that the substantially solid jet is off-centered with respect to a center of the first nozzle.

In this way a hollow jet of liquid is formed. Through the impact against the first nozzle, which may be for example cone shaped, the liquid is directed outwardly and the air partially surrounding the substantially solid jet of liquid is directed inwardly, thereby forming a hollow jet of liquid.

Optionally or alternatively, the liquid flow path includes a first nozzle arranged for generating a substantially solid jet of liquid. The first nozzle terminates at a side wall of the mixing chamber, and the liquid of the substantially solid jet contacts a substantial portion of an inner surface of the first nozzle in an area adjacent to the mixing chamber. In this way, a drink having a reduced foam layer may be produced, as the solid jet does not supply air to the mixing chamber. However, it is conceivable that air is supplied by other means to the chamber, for example by a separate air inlet, and that a beverage having a foam layer may be produced by the solid jet.

Optionally, the first nozzle tapers towards the mixing chamber, and the liquid flow path comprises a second nozzle located upstream from the first nozzle and arranged for generating a substantially solid jet of liquid. The first and second nozzle are positioned relative to each other such that the substantially solid jet of liquid is centered with respect to a center of the first nozzle. As the substantially solid jet is centered with respect to the center of the first nozzle, the impact does not cause the jet to swirl around the inner surface of the first nozzle and thus the jet remains substantially solid.

Optionally the first and second nozzle are relatively movable between at least a first and a second position. In the first position the first and second nozzle are positioned relative to each other such that the substantially solid jet is off-centered with respect to a center of the first nozzle. In the second position the first ands second nozzle are positioned relative to each other such that the substantially solid jet of liquid is centered with respect to a center of the first nozzle. In the first position, the liquid supply means is arranged for supplying a hollow jet of liquid to the mixing chamber. This is a effective manner to supply both liquid and air to the mixing chamber, and to produce a beverage having a foam layer. In the second position, the liquid supply means is arranged for supplying a substantially solid jet to the mixing chamber. This may be useful in producing beverages having a reduced foam layer, or where a foam layer is not desirable. In both cases, the liquid of the jet sealingly contacts most of the inner surface of the first nozzle in the area adjacent to the mixing chamber, which prevents beverage related ingredient from flowing out of the mixing chamber and into the liquid flow path.

Preferably, the first nozzle is stationary and the second nozzle is movable relative to the first nozzle.

Preferably, the first nozzle is substantially cone shaped.

Optionally, the liquid flow path further comprises an intermediate portion separating the first nozzle from the second nozzle, and wherein the liquid flow path is arranged such that air flow around the substantially solid jet is possible. It will be appreciated that the air flow about the substantially solid jet of liquid may be made possible by the size, for example cross section, and/or position of the intermediate portion.

Optionally, the liquid flow path further comprises an intermediate portion separating the first nozzle from the second nozzle, and wherein the liquid flow path is arranged such that the substantially solid jet travels, in steady state, from the second nozzle to the impact zone of the first nozzle without contacting an inner surface of the intermediate portion.

Optionally, the air supply means comprise an air supply duct in fluid communication with the liquid flow path and located upstream from the first nozzle, and preferably the air supply duct is connected to the intermediate portion of the liquid flow path. It has been found that the hollow jet of liquid is an effect manner for supplying air to the mixing chamber.

The air supply means may be passive. Optionally, the second nozzle includes a venturi and is arranged for sucking air into the liquid flow path when liquid flows through the second nozzle. In this way air is sucked into the liquid flow path and transferred to the mixing chamber by the hollow jet of liquid formed at the first nozzle. Furthermore, the passive air supply means help prevent back flow of the mixture in the mixing chamber, as air is being sucked into the liquid flow path and supplied into the mixing chamber.

Optionally, the air supply means comprise a first air supply valve arranged for selectively connecting the air supply duct to an air supply, preferably to atmosphere. In this way, the amount of air transported to the mixing chamber may be controlled. By controlling the amount of air entering the mixing chamber, the foam layer may be controlled.

Optionally, the air supply means is active, for example, the air supply means further comprise an air pump arranged for actively supplying air to the liquid flow path via the air supply duct.

Optionally, the air supply means further comprise a second air supply valve arranged for selectively connecting the air pump to the air supply duct. In this way air entering the system via the air pump can be controlled.

Optionally, the first and/or second air supply valve is biased closed. In this way, the beverage preparation device is arranged for selectively opening the first and/or second air supply valve.

Optionally, the beverage preparation device is arranged for selectively opening the first air supply valve when the drive shaft is activated. In this way air is supplied to the mixing chamber at the same time that beverage related ingredient is being supplied for produced a beverage consumption with a foam layer.

Optionally, the air supply duct includes a one way valve arranged to prevent liquid from traveling along the air supply duct. The one way valve prevents liquid from traveling up into the air supply duct. This prevents the air supply duct from being dirtied by mixture residue and provides a system that is more hygienic.

Optionally, the beverage preparation device comprises flushing means arranged for supplying a flushing fluid, and a flush valve arranged for selectively connecting the flushing means to the air supply duct, wherein the flush valve is located downstream from the one way valve such that flushing fluid supplied by the flushing means flows from the flush valve through the air supply duct into the liquid flow path and into the mixing chamber. In this way a flushing liquid, such as water, can be cycled through a portion of the air flow path and a portion of the liquid flow path.

Optionally, the beverage preparation device is arranged for opening the first air valve and the flushing valve simultaneously.

Optionally, the beverage preparation device is arranged for activating the air pump and for opening the second air valve, for example at the end of a beverage cycle, for a period of 1-5 seconds. Activating the air pump may help flush out any residual liquid in the air flow path and/or liquid flow path. This may result in the system being more hygienic.

Optionally, the beverage preparation device is arranged for activating the air pump and opening the second air valve for a period of simultaneous to the activation of the drive shaft. In this way, a beverage having a foam layer may be produced. Actively supplying air, by means of an air pump, and controlling the air supply by means of the second air valve, while supplying a beverage related ingredient from the outlet of the doser, may provide more control to the foaming process.

Optionally, the liquid supply means is arranged for supplying the liquid to the mixing chamber in a direction substantially tangential to a vertical extent of the mixing chamber such that a liquid swirl is created in a mixing direction. In this way, a swirl is created in the mixing chamber. It has been found that such a swirl promotes mixing and improves foaming.

Optionally, an upstanding inner wall of the mixing chamber is provided with an inlet for supplying liquid to the mixing chamber, and wherein adjacent to the inlet, in a direction opposite the mixing direction, a ramp is provided for directing liquid swirling in the mixing chamber away from the upstanding wall in the area of the inlet. In this way liquid already in the mixing chamber is launched by the ramp over the liquid supply inlet. This helps prevent liquid from entering the inlet and traveling up the liquid flow path. In this way contamination of the liquid flow path, and mixture residue buildup is prevented. Additionally, it has been found that by launching the mixture swirling in the mixing chamber over the liquid supply inlet foaming is promoted. Without wishing to be bound by any theory, it is believed that the ramp helps reduce the centrifugal force at the inlet of the mixing chamber, which therefore reduces the back pressure at the inlet of the mixing chamber.

Also according to the invention a beverage preparation device is provided for use with at least one exchangeable supply pack holding a beverage related ingredient. The beverage preparation device comprises a mixing chamber having a beverage outlet, liquid supply means including a liquid flow path for supplying a liquid to the mixing chamber; air supply means for supplying air to the liquid flow path, and a drive shaft. The beverage preparation device is mechanically connectable with at least one exchangeable supply pack. When the beverage preparation device is connected to the at least one exchangeable supply pack, the mixing chamber of the beverage preparation device is in fluid communication with an outlet of the at least one exchangeable supply pack and the drive shaft of the beverage preparation device is arranged for transmitting torque from the beverage preparation device to the at least one exchangeable supply pack. When the drive shaft is activated, beverage related ingredient is supplied from the outlet of the exchangeable supply pack into the mixing chamber.

Also according to the invention a method is provided for preparing a beverage, for example with the system according to the invention. The method includes the steps of providing a beverage preparation device comprising a mixing chamber having a beverage outlet and a drive shaft; providing at least one exchangeable supply pack holding a beverage related ingredient, wherein the at least one exchangeable supply pack includes a container for holding a beverage related ingredient, and a doser having an outlet, wherein the doser is arranged for supplying the beverage related ingredient from the container to the outlet of the doser in a dosed manner; mechanically connecting the at least one exchangeable supply pack to the beverage preparation device such that the outlet of the doser is in fluid communication with the mixing chamber and the drive shaft is arranged for transmitting torque from the beverage preparation device to the doser; supplying liquid to the mixing chamber; supplying air to the mixing chamber; and activating the drive shaft to supply beverage related ingredient to the mixing chamber.

Also according to the invention a beverage preparation unit is provided for preparing beverage consumptions using a beverage related ingredient. The beverage preparation unit comprises a mixing chamber having a beverage outlet, a liquid flow path for supplying a liquid to the mixing chamber, and an air flow path for supplying air to the liquid flow path. The mixing chamber is arranged for receiving a beverage related ingredient, such as concentrate, preferably from an exchangeable supply pack. Optionally, the liquid flow path is arranged for generating a hollow jet of liquid having an outer liquid portion extending in a flow direction of the jet and an inner air portion extending in a flow direction of the jet wherein the outer liquid portion surrounds the inner air portion. It will be appreciated that features discussed above may be included in the unit.

Optionally, where the liquid flow path enters the mixing chamber, the mixing chamber has a diameter in the range of 5 mm-100 mm, preferably 5 mm-50 mm, and more preferably 10 mm-20 mm. The diameter is preferably measured at the middle of the liquid flow path where the liquid flow path enters the mixing chamber, for example in the form of an inlet. It will be appreciated that if a ramp is present in the mixing chamber the diameter of the mixing chamber is measured as if the ramp was not present. As the mixing chamber preferably tapers the diameter measured in the vicinity above where the liquid flow path enters the mixing chamber may be different from the diameter in the vicinity below where the liquid flow path enters the mixing chamber. However these diameters preferably also fall within the given range.

Also according to the invention a beverage preparation unit in combination with a pump is provided.

Also according to the invention a beverage preparation unit in combination with an air pump is provided. The air flow path of the unit is arranged to be in fluid communication with the air pump. Optionally, the air pump is arranged for supplying air to the air flow path at a pressure in the range of 0.05 bar-10 bar, preferably 0.1 bar-0.3 bar, and most preferably 0.1 bar-0.2 bar. Optionally, the air pump is one of a membrane pump, a positive displacement pump, and a gear pump. Optionally, the air pump is arranged to be powered by direct current. Optionally, the air pump is arranged to be powered by alternating current.

Also according to the invention a beverage preparation unit in combination with an liquid pump, such as a water pump, is provided. The liquid flow path of the unit is arranged to be in fluid communication with the liquid pump. Optionally, the liquid pump is arranged for supplying liquid to the liquid flow path at a pressure in the range of 0.5 bar-15 bar, preferably 1 bar-7 bar, and most preferably 1.5 bar-3 bar. Optionally, the liquid pump is one of an oscillating piston pump, a gear pump, and a positive displacement pump. Optionally, the liquid pump is arranged to be powered by direct current. Optionally, the liquid pump is arranged to be powered by alternating current.

Also according to the invention a beverage preparation unit in combination with liquid conditioning unit is provided. The liquid flow path of the unit is arranged to be in fluid communication with the liquid conditioning unit. Optionally, the liquid conditioning unit is arranged to heat and/or cool liquid, such as water, to be supplied to the liquid flow path to a temperature in the range of 2-100 degrees Celsius, preferably 5-80 degrees Celsius. Optionally, the liquid conditioning unit has a volume of 100 mL-20000 mL, preferably a volume of 5000 mL-10000 mL.

Optionally, the liquid conditioning unit is a boiler and is arranged for heating liquid, such as water, to be supplied to the liquid flow path to a temperature in the ranges of 50-100 degrees Celsius, preferably 60-90 degrees Celsius, and most preferably 70-80 degrees Celsius.

Optionally, the liquid conditioning unit is a cooler and is arranged for cooling liquid, such as water, to be supplied to the liquid flow path to a temperature in the ranges of 2-20 degrees Celsius, preferably 5-15 degrees Celsius, and most preferably 5-10 degrees Celsius.

Optionally, the liquid conditioning unit includes a boiler and/or a cooler.

Also according to the invention a beverage preparation unit in combination with at least one of a pump, an air pump, a liquid pump, and a liquid conditioning unit is provided. The at least one pump, air pump, liquid pump, and liquid conditioning unit optionally being such as describe above.

BRIEF DESCRIPTION OF THE DRAWINGS

The invention will now be further elucidated by means of non-limiting examples referring to the drawings, in which.

DETAILED DESCRIPTION

Figure 1:
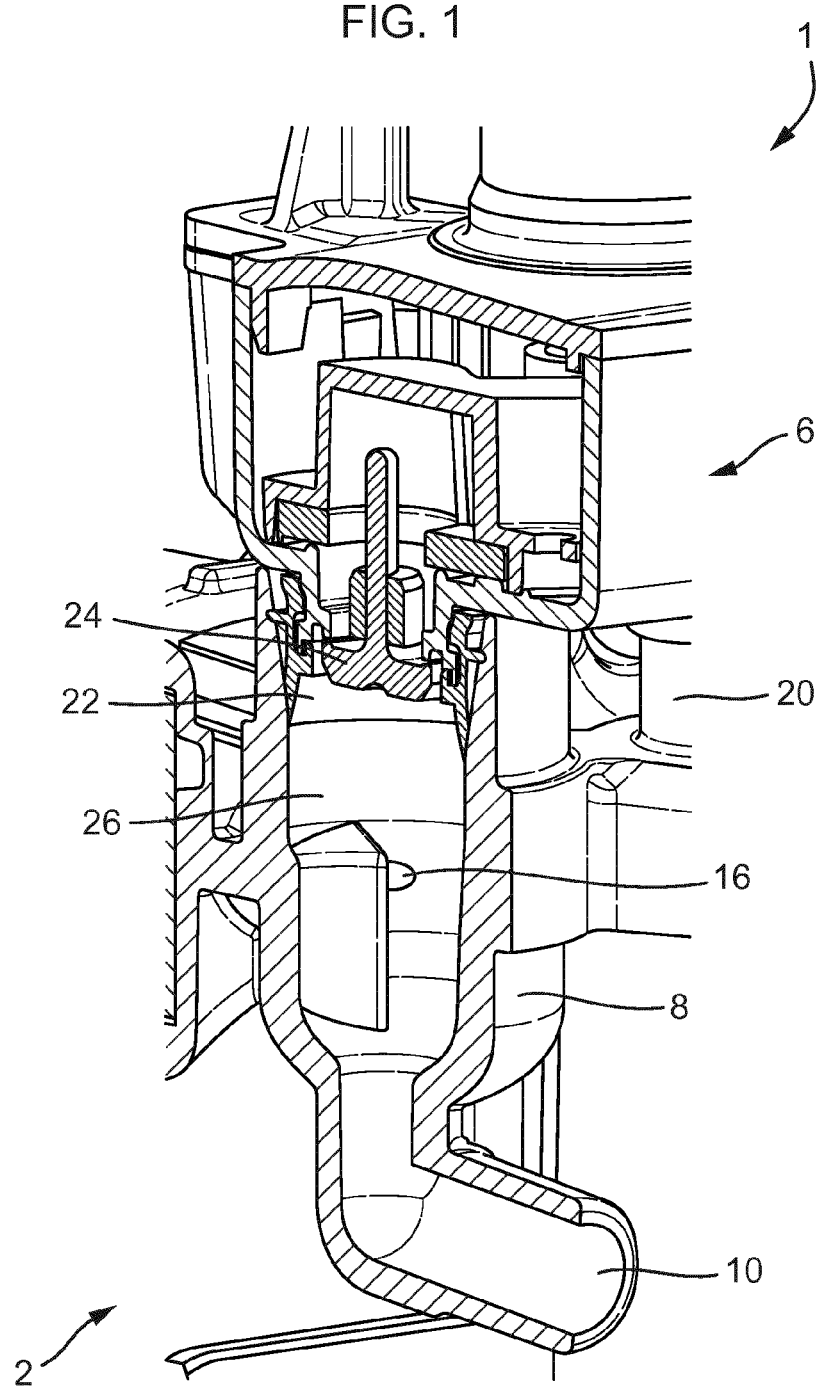
FIG. 1 shows a perspective view of a beverage preparation device connected to a doser of an exchangeable pack of a system according to the invention.
Figure 2A:
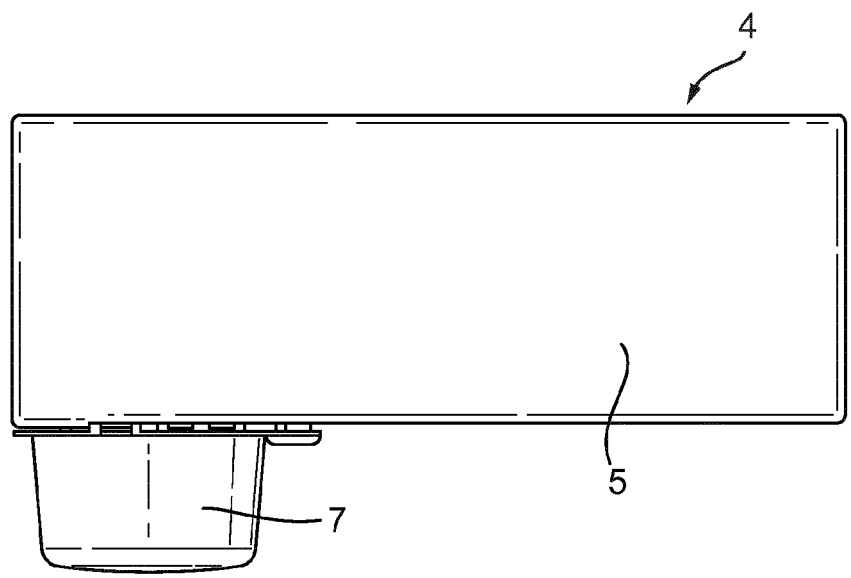
FIG. 2A shows a schematic view of an exchangeable pack of a system according to the invention.
Figure 5:
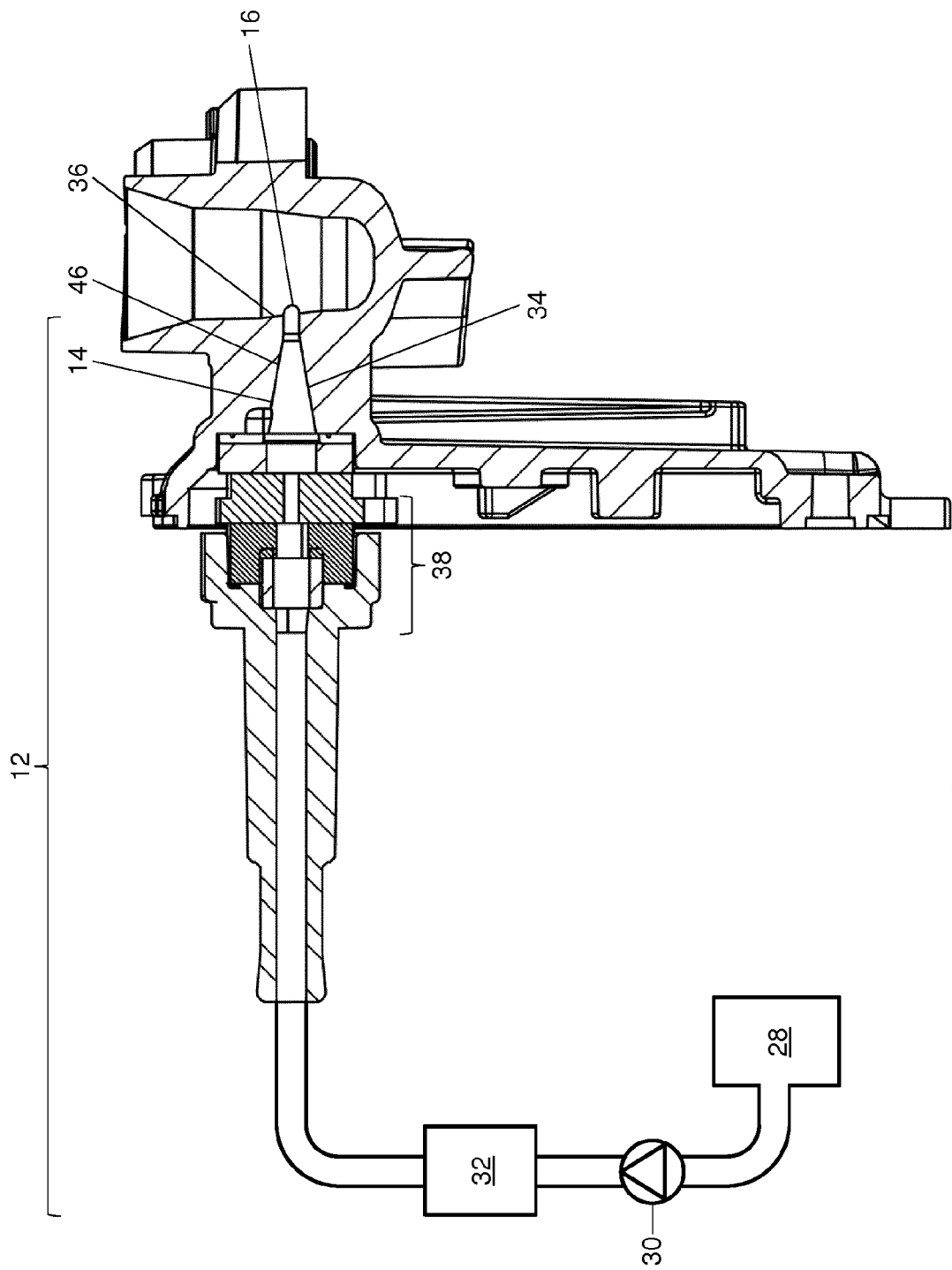
FIG. 5 shows a side plan view of a beverage preparation device of a system according to the invention.
Figure 6:
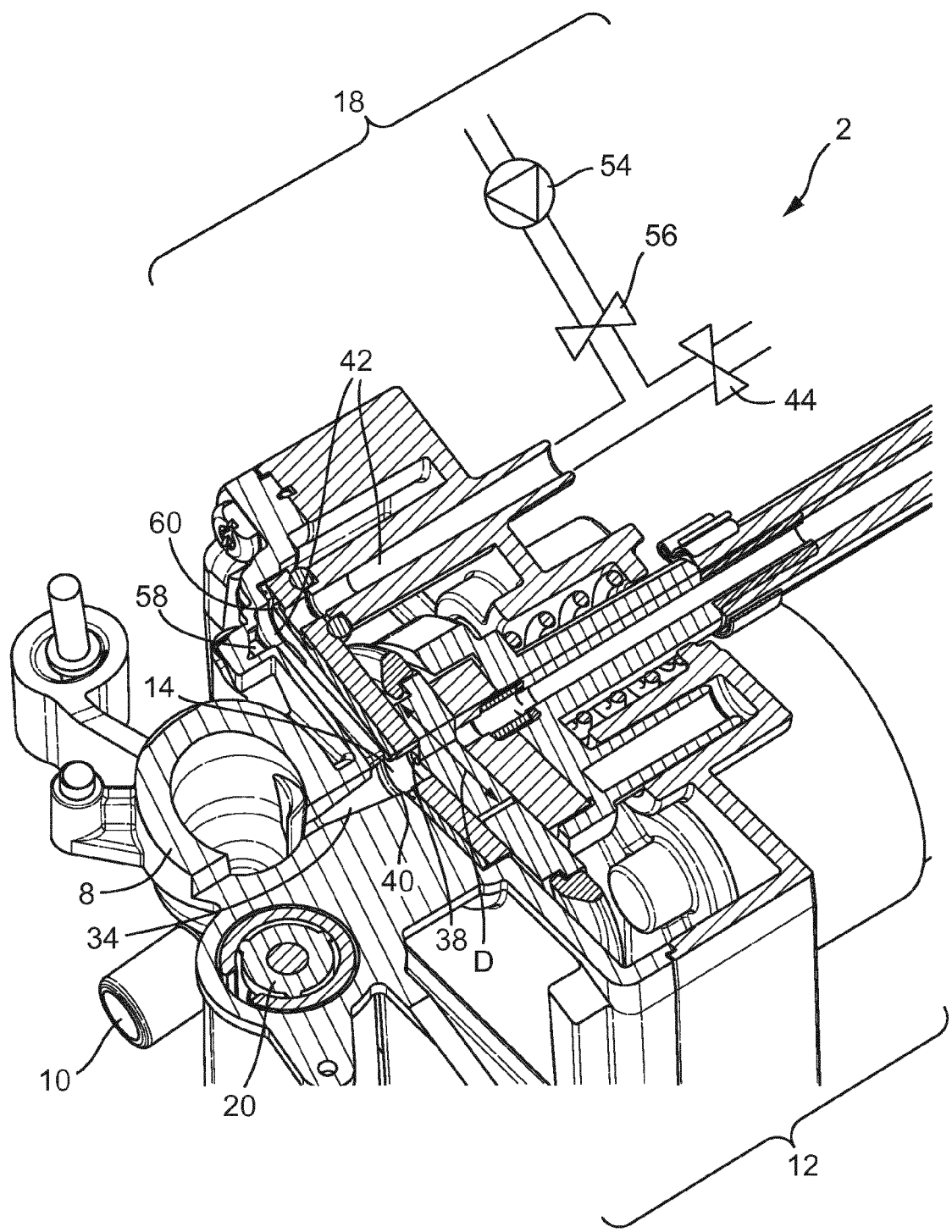
FIG. 6 shows a perspective cut-away view of a beverage preparation device of a system according to the invention.
Figure 9:
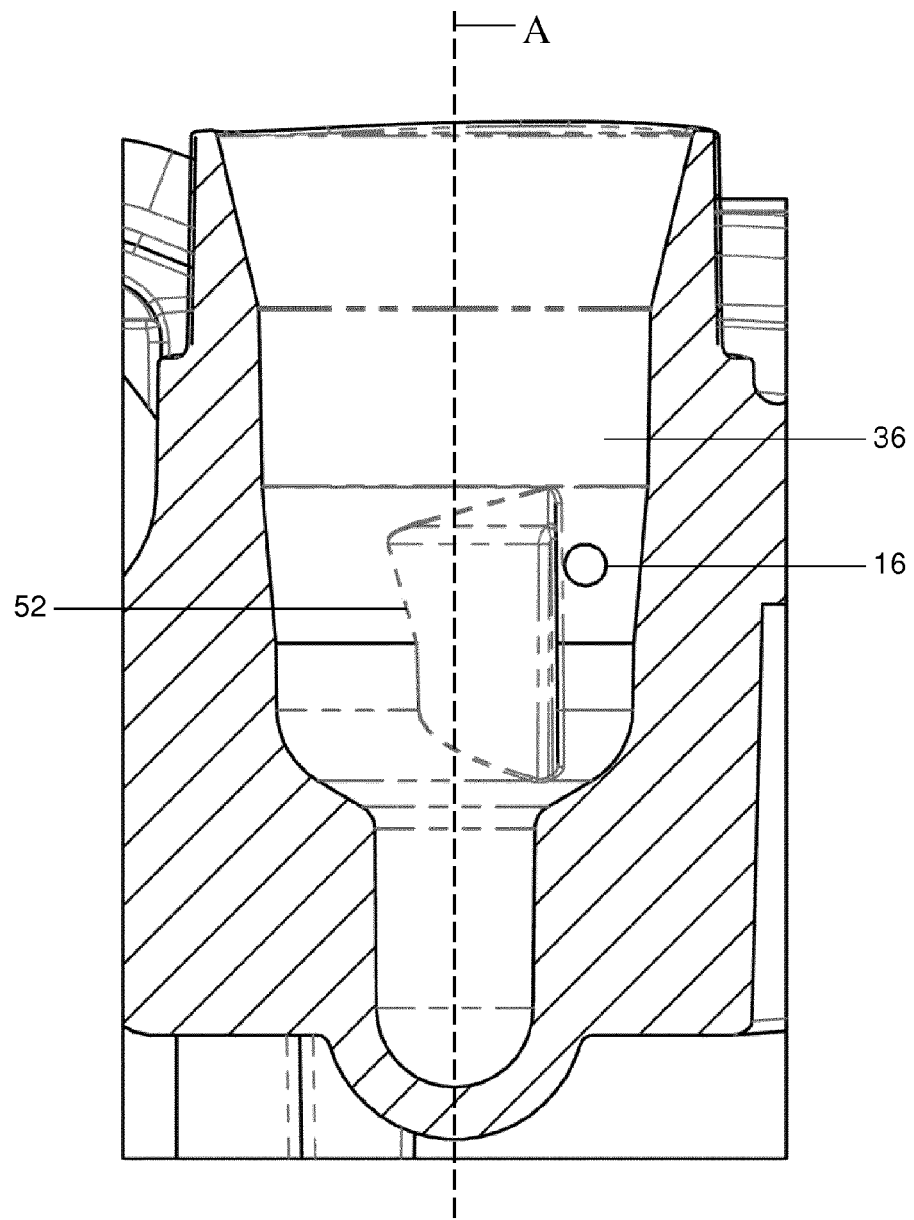
FIG. 9 shows a side plan view of a beverage preparation device of a system according to the invention.

The same reference numerals are used for features appearing in multiple Figures. The system 1 for preparing beverage consumptions comprises a beverage preparation device 2, and at least one exchangeable supply pack 4 arranged for holding a beverage related ingredient. FIG. 1 shows the system 1 for preparing beverage consumptions. In FIG. 1, a beverage preparation device 2 and a doser 6 of an exchangeable supply pack are shown. The exchangeable supply pack 4 is shown in FIG. 2A. The exchangeable supply pack includes a container 5 holding a beverage related ingredient, such as concentrate. The beverage preparation device 2 comprises a mixing chamber 8 having a beverage outlet 10. In this example, the mixing chamber 8 has a volume of about 4.5 ml. The mixing chamber tapers outwardly in an upward direction towards the top of the mixing chamber, see FIG. 9. The, liquid supply means 12 detailed in FIGS. 5 and 6 is arranged for supplying a liquid, in this example water under pressure, to the mixing chamber 8, via inlet 16. As shown in FIG. 9, the mixing chamber has a diameter DM, in this example 15 mm, where the liquid flow path enters the mixing chamber. In this example the liquid flow path enters through inlet 16. The air supply means 18, detailed in FIG. 6, is arranged for supplying air to the liquid flow path 14. The beverage preparation device also comprises a drive shaft 20. The doser 6, explained later in detail with regard to FIG. 4, has an outlet 22. The doser 6 is arranged for supplying beverage related ingredient, in this example concentrate, from the container 5 to the outlet 22 of the doser 6 in a dosed manner.

Figure 3:
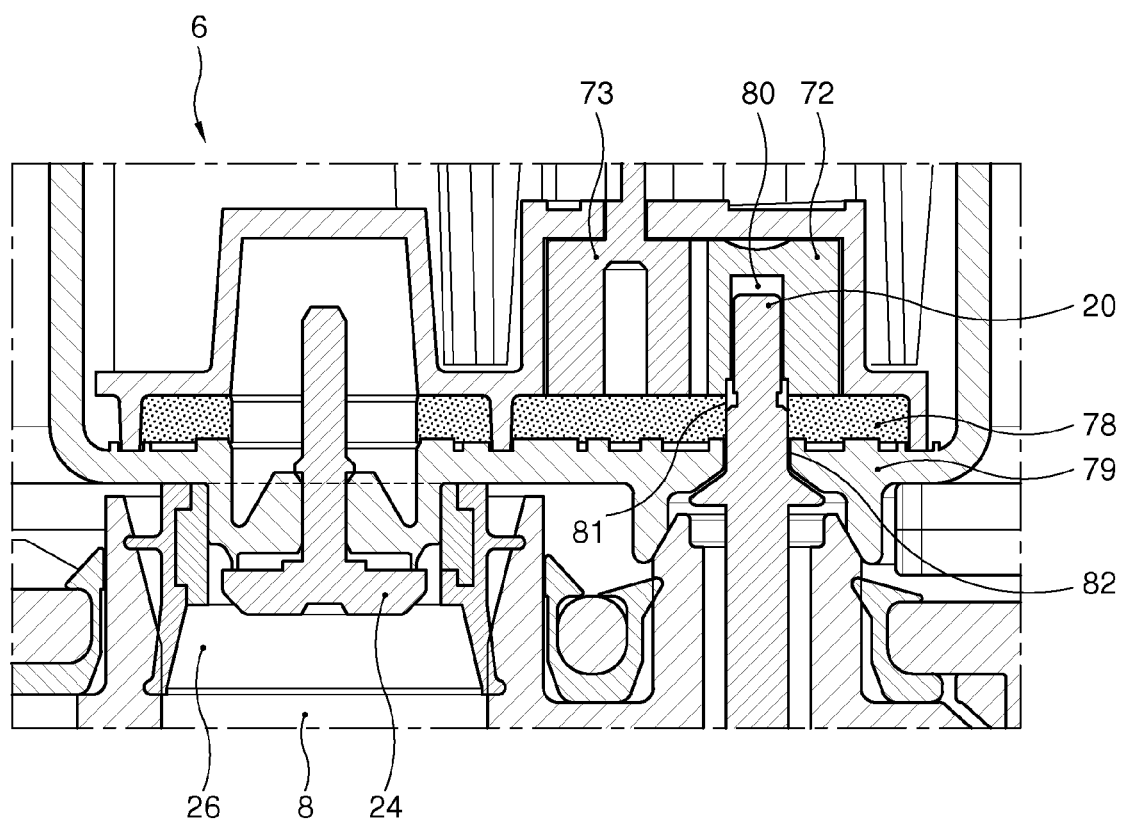
FIG. 3 shows a cut-away view of the mechanical connection between the exchangeable pack and the beverage preparation device of a system according to the invention

The at least one exchangeable supply pack 4 and the beverage preparation device 2 are mechanically connectable. The mechanical connection is shown in FIG. 3. In this example, the mechanical connection is made by the drive shaft 20 to the doser 6.

As seen in FIGS. 1 and 3, when connected the outlet 22 of the doser 6 is brought in fluid communication with the mixing chamber 8 through an opening 26 in the top of the mixing chamber and the drive shaft 20 of the beverage preparation device 2 is arranged for transmitting torque from the beverage preparation device to the doser 6 such that when the drive shaft 20 is activated beverage related ingredient, in this example concentrate is supplied from the outlet 22 of the doser 6 into the mixing chamber 8. The functional height H of the mixing chamber is shown in FIG. 1. In this example the functional height H is 20 mm.

The doser 6 is attached to one side of the exchangeable supply pack 5 and includes a pump assembly 61. The pump assembly 61 enables the pumping of a desired dosage of the ingredient from the container 5 to the beverage dispensing device. Prior to use of the exchangeable supply pack 4, the doser 6 may be protected by a protective part 7 visible in FIG. 2A.

Figure 2B:
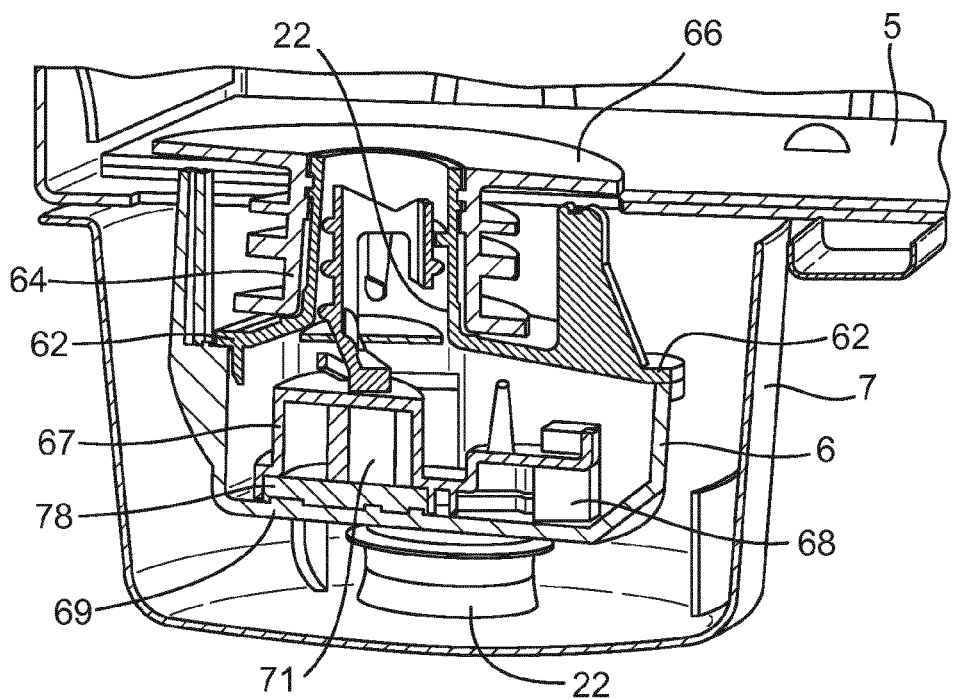
FIG. 2B shows a schematic cross-section view of the doser of the exchangeable pack of FIG. 2A.

In FIG. 2B, which illustrates a cross section of the exchangeable supply pack 5 including the doser 6, it can be seen how the doser 6 is attached to the exchangeable supply pack 4. The doser 6 comprises a top cap 62 including an adapter 63 which is inserted into a spout 64 that is fixed with the container 5 of the pack 4. Inside the container 5, the spout 64 is attached by means of a spout ring 66.

The spout 64 of the exchangeable supply pack 4 may be shaped correspondingly with the adapter 63 such as to fix the adapter and therewith the doser 6 to the exchangeable supply pack 4. Additionally, the spout may further be shaped to seal the connection between the spout 64 and the adapter 63 such as to prevent leakage of the ingredient out of the container 5 in use.

The doser 6 includes a pump channel 67 which is formed by a pump housing 68 and a bottom housing 69. The pump housing 68 and the bottom housing 69 may be correspondingly shaped such as to enable engagement there between for forming the pump channel 67. The pump channel at least includes a pump chamber 70 (see FIG. 4) which includes a gear pump 16. Using the gear pump 71, the ingredient is transported from the container 5 to an outlet 22 of the doser 6.

Figure 4:
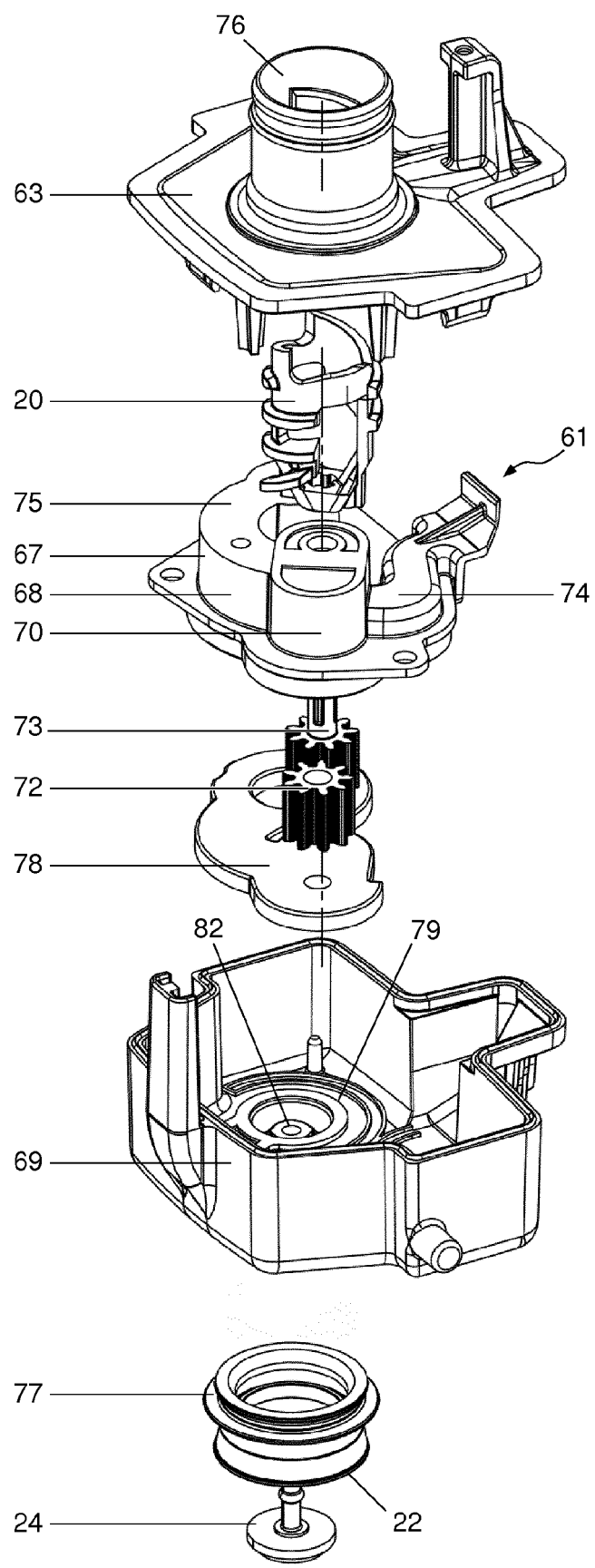
FIG. 4 shows an exploded perspective view of a doser of an exchangeable pack of a system according to the invention.

FIG. 4 provides an exploded view of a doser 6. Visible in FIG. 4 are the adapter 63, the pump housing 68, and the bottom housing 69 of the doser 6. The pump chamber 70 includes two mutually engaging gears 13 and 18. The gears 72 and 73 are located in the pump chamber 70 closely fitting therewith, such as to provide the gear pump 71. The gear pump 71 can be operated by operating the driving gear 72, which in turn will drive the driven gear 73 in counter rotation. Because the teeth of the gears 72 and 73 move closely past the inside of the walls of the pump chamber 70, the fluid is pumped from the inlet channel 74 to the outlet channel 75 of the pump channel 67. The driving gear 72 comprises a shaft opening 80 for receiving the drive shaft 20 of the beverage preparation device for operating the gear pump.

In the assembled state the fluid is received through the inlet 76 at the open end of the adapter 63, and will flow to the interior of the bottom housing 69 of the assembly. From there, it will further flow into the inlet channel 74 until it reaches the pump chamber 70. When the gear pump is operated by the drive shaft, ingredient is transported by the gears 72 and 73 to the outlet channel 75 towards the outlet 22. Near the outlet 22, the doser further includes seal 77 for providing of the ingredient to the beverage dispensing machine. The doser 6 further includes a valve 24 arranged in the outlet 22 for closing the doser, e.g. when not in use or when the mixing chamber 8 is being rinsed to prevent bacterial growth.

In between the driving gear 72 and the support wall 79 being formed integrally with the bottom housing 69, a flexible seal 78 is present to prevent leakage. The flexible seal 78 for example seals the connection between the pump housing 68 and the bottom housing 69 forming the pumping channel and pumping chamber. The flexible seal 78 further cooperates within the pumping assembly such as to prevent leakage along the drive shaft 20 that will drive the driving gear 72. The flexible seal extends underneath and beyond the side walls of the pump channel 67 formed by pump housing 68 for at least a part of the periphery of the pumping chamber 70 and optionally also the outlet channel 75, such that the seal 78 is fixed in between the pump housing 68 and the bottom housing 69. The flexible seal 78 comprises a through opening 81 coinciding with the shaft opening 80 and the axle reception opening for receiving the driving shaft.

The outlet 22 of the doser 6 is closed off by the one way valve 24. The valve 24 is biased closed in order to seal off the doser outlet 22 when not in use. When the gear pump is driven by the drive shaft 20, the gear pump pumps concentrate towards the outlet 22 of the doser 6 driven the gear pump. The pump assembly pumps concentrate towards the outlet 22 of the doser 6. When the bias of the one way valve 24 is overcome, concentrate flows with help from the gear pump and the influence of gravity into the mixing chamber 8.

In this example, when driven by the drive shaft 20 of the beverage preparation device 2, the doser 6 is arranged for supplying concentrate to the mixing chamber 8 at a rate of 0-7 ml/sec. This range enables the system 1 to produce a wide range of beverages, for example espresso, lungo, cappuccino, etc.

The liquid supply means 12 is arranged for generating a hollow jet of liquid, in this example water, and for supplying the hollow jet into the mixing chamber 8 through the inlet 16. The liquid flow path 14 includes a first nozzle 34 arranged for creating a hollow jet of water. The hollow jet of water has an outer liquid portion and an inner air portion.

The first nozzle 34 tapers towards the mixing chamber 8 and terminates the inlet 16 in a sidewall 36 of the mixing chamber 8. The liquid flow path 14 comprises a second nozzle 38 located upstream from the first nozzle 34 and arranged for generating a substantially solid jet of liquid.

Hot water is supplied under pressure to the second nozzle 38. Therefore the liquid supply means 12 further includes a water reservoir 28, a water pump 30 and a water heater 32. An intermediate portion 40 separates the first nozzle 34 and the second nozzle 38. In this example the intermediate portion 40 is tubular. Air flow is possible around the substantially solid jet in the intermediate portion.

The intermediate portion 40 is connected to air supply means 18, shown in FIG. 6, which in this example, include an air duct 42 which is in fluid communication with the liquid flow path 14. The air duct is located upstream from the first nozzle 34 and downstream from the second nozzle 38. The air duct 42 is connected to a first air supply valve 44 arranged for selectively connecting the air supply duct 42 to an air supply to the ambient air. The second nozzle 38 includes a venturi in fluid communication with the intermediate portion 40 and therefore in fluid communication with ambient air when the first air supply valve 44 is open. When the liquid supply means 12 are activated and water flows through the second nozzle, air is sucked into the liquid supply path by the venturi of the second nozzle. The air supply means 18 are passive.

As the substantially solid jet of water travels from the second nozzle 38 to the first nozzle 34, it does not contact an inner surface of the intermediate portion 40. Therefore air flow around the substantially solid jet of water is possible.

Figure 7:
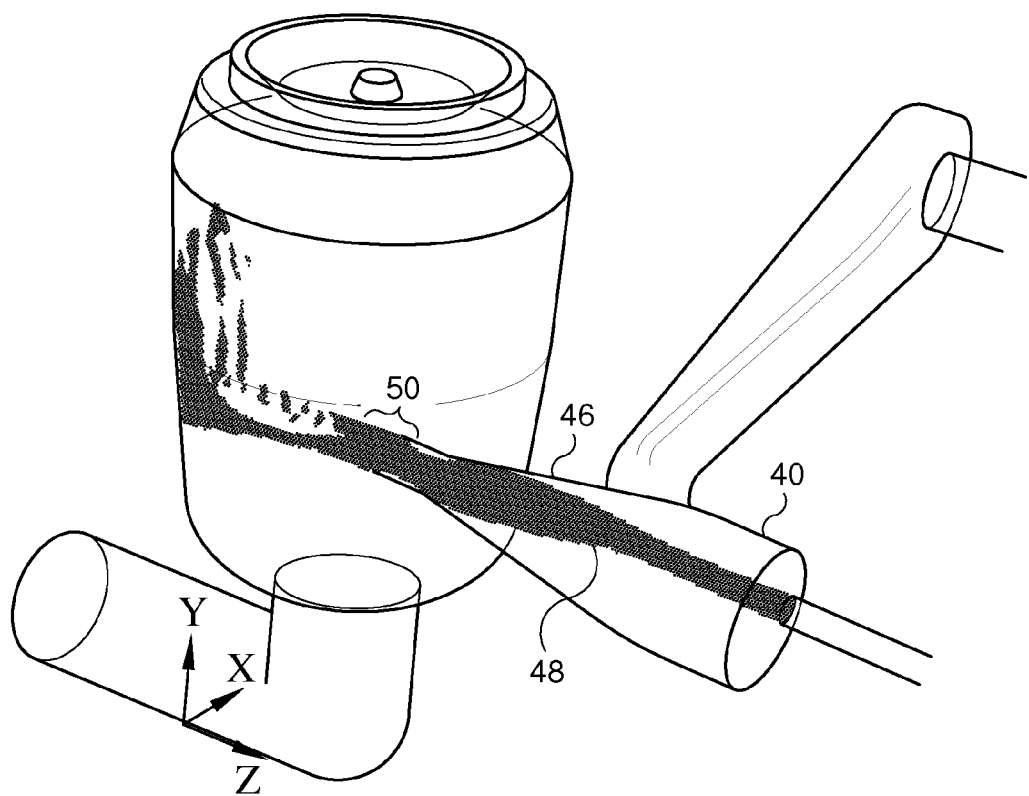
FIG. 7 shows simulated view of a beverage preparation device of a system according to the invention.

The nozzles 34, 38 are positioned relative to each other such that the substantially solid jet of liquid impacts an inner surface 46 of the first nozzle 34 in an impact zone 48. As shown in FIG. 7, this causes the jet to swirl around the inner surface 46 of the first nozzle 34. The liquid of the substantially solid jet is directed outwardly and the air surrounding the substantially solid jet of liquid, in the intermediate portion 40, is directed inwardly, thereby forming a hollow jet of water. It is noted that the second nozzle 38 is positioned such that the substantially solid jet is off-centered with respect to a center of the first nozzle. This is best seen in of FIG. 7.

When generated, the outer water portion of the jet sealingly contacts substantially the entire inner surface 46 of the nozzle 34 in an area 50 directly adjacent to the inlet 16 to the mixing chamber 8. In this way the mixture mixing in the mixing chamber is prevented from exiting the mixing chamber 8 through the inlet 16 and into the first nozzle 34 of the liquid flow path 14. The prevents mixture residue from forming in the liquid flow path 14 and may improve overall hygiene of the system.

In this example, the first nozzle 34 is stationary and the second nozzle 38 is movable relative to the first nozzle, in a direction D. In particular, the first and second nozzle 34, 38 are relatively movable between a first and a second position. In the first position, shown in FIG. 6, the first and second nozzle 34, 38 are positioned relative to each other such that the substantially solid jet is off-centered with respect to a center of the first nozzle. In the second position the first ands second nozzle 34, 38 are positioned relative to each other such that the substantially solid jet of liquid is centered with respect to a center of the first nozzle. As described above, in the first position, the liquid supply means 12 is arranged for supplying a hollow jet into the mixing chamber 8. In the second position, the liquid supply means is arranged for supplying a substantially solid jet of liquid to the mixing chamber 8. When the liquid supply means 12 supplies a substantially solid jet of liquid, the liquid of the jet also sealingly contacts substantially the entire inner surface 46 of the nozzle 38 in an area 50 directly adjacent to the inlet 16 to the mixing chamber 8. In this way, the mixture in the mixing chamber 8 is prevented from flowing out of the mixing chamber 8 and into the liquid flow path 14.

Figure 8:
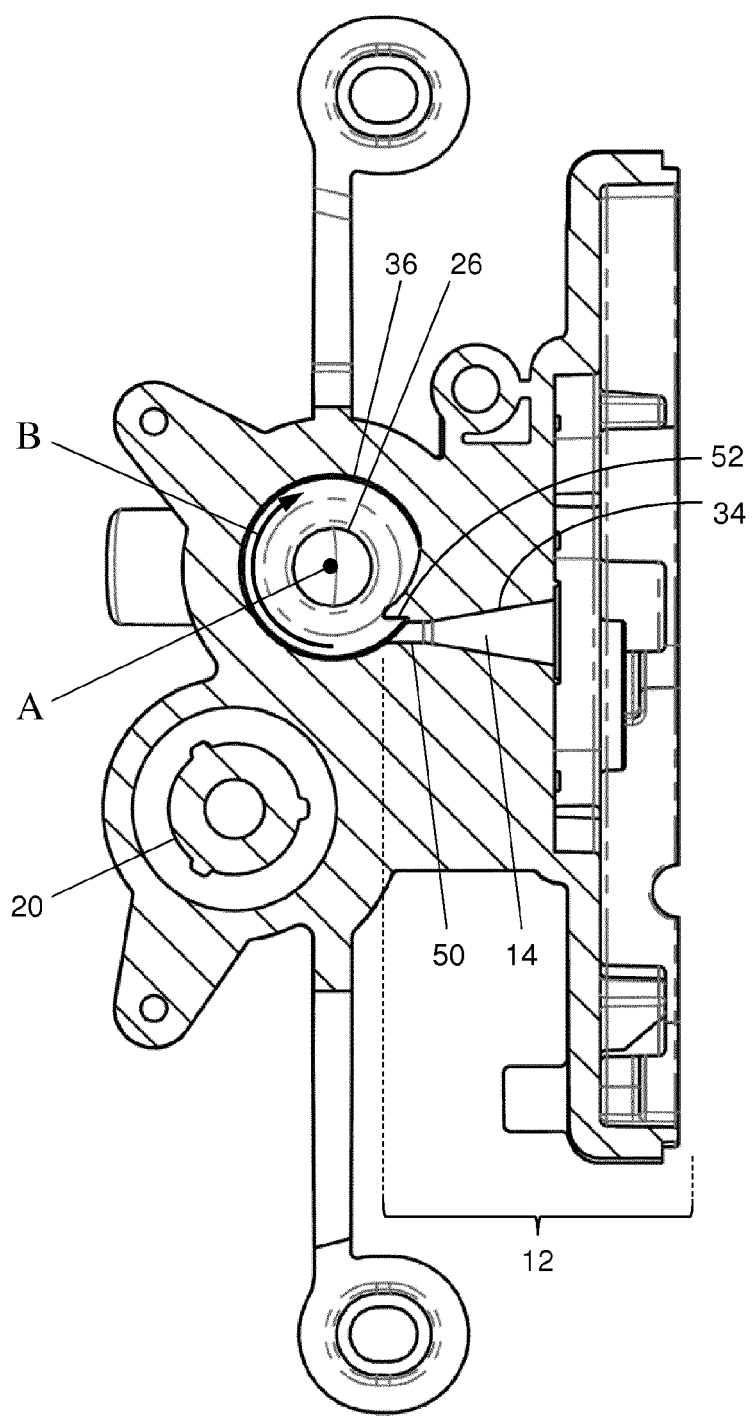
FIG. 8 shows a top plan view of a beverage preparation device of a system according to the invention.

As seen from FIG. 8, the liquid supply means 12 and the liquid flow path 14 supply water to the mixing chamber in a direction substantially tangential to a vertical extent A of the mixing chamber 8. In this way, when water is supplied to the mixing chamber 8, a swirl of mixture is created in a mixing direction B. This helps better mix the concentrate and water in the mixing chamber. In addition, the swirl promotes foaming of the mixture. In this way beverage consumptions with a foam layer can be produced. Adjacent to the inlet 16, in a direction opposite the mixing direction B, a ramp 52 is provided. The ramp 52 directs the mixture swirling in the mixing chamber 8 for directing liquid swirling in the mixing chamber away from the upstanding wall, sidewall 36, in the area of the inlet 16. Directing the mixture away from the sidewall 3 helps prevent the mixture from exiting the mixing chamber 8 and traveling up the liquid flow path 14. In this way, mixture residue buildup in the liquid flow path is reduced. Additionally, it is believed that by launching the mixture swirling in the mixing chamber 8, by means of the ramp 52, over the liquid supply inlet 16 foaming is promoted. It is believed that the ramp 52 helps reduce the back pressure at the inlet 16 of the mixing chamber 8.

In this example, the air supply means 18 further comprise an air pump 54 arranged for actively supplying air to the liquid flow path 14 via the air supply duct 42. The air pump 54 is connected to the air duct 42 by a second air supply valve 56. Both the first and second air supply valves 44 and 56 are biased closed.

In this example, the beverage preparation device 2 comprises flushing means 58 for supplying a flushing fluid, in this example water, to the air supply duct 42. The air supply duct 42 includes a one way valve 60, which prevents flushing water from traveling along the air supply duct 42. As shown in FIG. 6, the flushing means 58 is connected to the air duct 42 at T-junction. The flushing means 58 is located downstream from the one way valve 60 such that flushing fluid, in this example water, supplied by the flushing means 58 flows through the air supply duct 42 into the liquid flow path 14 and into the mixing chamber 8. Typically, the flushing means 58 include a flush valve arranged for selectively connecting the flushing means 58 to the air supply duct 42.

Figure 10:
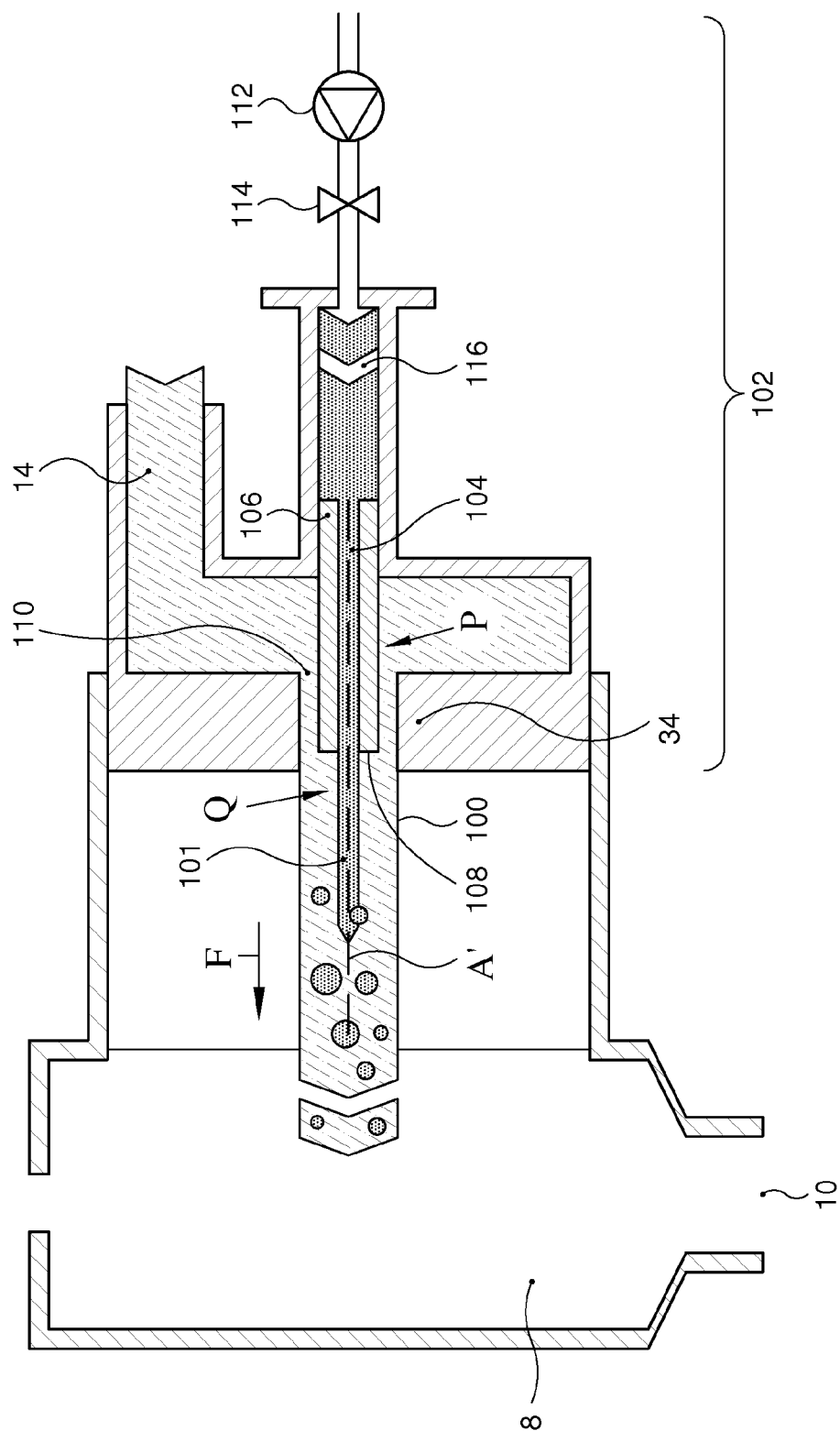
FIG. 10 shows a side plan view of an example of a beverage preparation device of a system according to the invention.

FIG. 10 show another example of a configuration for generating a hollow jet to be injected into the mixing chamber 8. This embodiment can be applied n each of the other embodiments discussed. In the embodiment as shown in FIG. 10 the supply pack 4 of a type as discussed for the other embodiments can be connected with the mixing chamber 8 on top of the mixing chamber. The liquid flow path 14 includes a first nozzle 34 and the liquid flow path 14 is arranged for generating a hollow jet of liquid having an outer liquid portion 100 extending in a flow direction, F, of the jet and an inner air portion 101 extending in a flow direction, F, of the jet wherein the outer liquid portion 100 surrounds the inner air portion 101. In this way the hollow jet has the form of a straw wherein the inner side of the straw represents the inner air portion 101 of the jet and the straw itself represents the outer liquid portion of the jet 102. Thus the hollow jet in fact is a combination of an jet of air and a hollow jet of liquid which surrounds the jet of air. The flow direction of the jet of air and the flow direction of the hollow jet of liquid is the same direction F.

In this example the jet which is generated extends in an axial direction A' of the jet, wherein the system is further provided with air injection means 102 for generating a flow of air and injecting the flow of air substantially coaxially in the jet. The flow direction of the jet is the same as the flow direction of the flow of air 104 so as to obtain the hollow jet.

In other words it holds that the flow of liquid in the liquid flow path 14 extends in an axial direction A' wherein the system is further provided with air injection means 102 for generating a flow of air which extends in the axial direction A' and for injecting the flow of air substantially coaxially in the flow of liquid in the liquid flow path 14 wherein the flow direction of the flow of liquid in the liquid flow path 14 is the same as the flow direction of the flow of air so as to obtain the hollow jet.

In this example, the liquid flow path 14 includes the first nozzle 34 which is arranged for generating a hollow jet of liquid. The air injection means comprise a needle 106 having an open end 108. The axial direction of the needle and the axial direction of the jet at least substantially coincide, as shown in FIG. 10. The length of a portion of the needle extending in the axial direction in the liquid flow path is indicated by L1 and is 9 mm. The open end 108 of the needle 106 is located in the nozzle 34, downstream from the entrance opening 110 of the nozzle 34. In this example, the open end 108 of the needle is centered in the axial extent of the nozzle 34. In this way the flow of air is injected into the center of the jet. The air injection means further include an air pump 112 and an air valve 114 for selectively generating a stream of air that is supplied to the needle 106 through an air channel 116 for generating a flow of air (which may for example be also described as an jet of air).

Thus in the center of the water jet a needle 106 with a certain length is placed. Typically, the needle 106 has an inside diameter of 0.2 mm.

With help of an speed regulated air pump, a flow of air (which may for example be also described as an jet of air) is pumped through the needle. Surrounding the needle 106, a flow of pressurized water is created. This configuration takes care to create a straight beam, i.e. not divergent and not converging. The air is protected from the under-pressure in the channel by the water jet.

In this way air is actively supplied by the hollow jet to the mixing chamber. In use the air injection means 102 is activated when the liquid supply means 12 is activated for supplying liquid, in this example water, to the liquid flow path 14.

In another embodiment the open end of the needle lays upstream of the nozzle 34 for example on a position indicated with arrow P. In that case the flow of air (which may for example be also described as an jet of air) can penetrate into and displace the liquid flow in the nozzle so that a hollow jet is formed.

In another embodiment the open end of the needle lays downstream of the nozzle 34 for example on a position indicated with arrow Q. In that case the flow of air (which may for example be also described as an jet of air) can penetrate into and displace the liquid flow downstream of the nozzle so that a hollow jet is formed. Other ways of injecting a jet of air in about the middle of a stream of water for generating a hollow jet also form part of the present invention.

Figure 12:
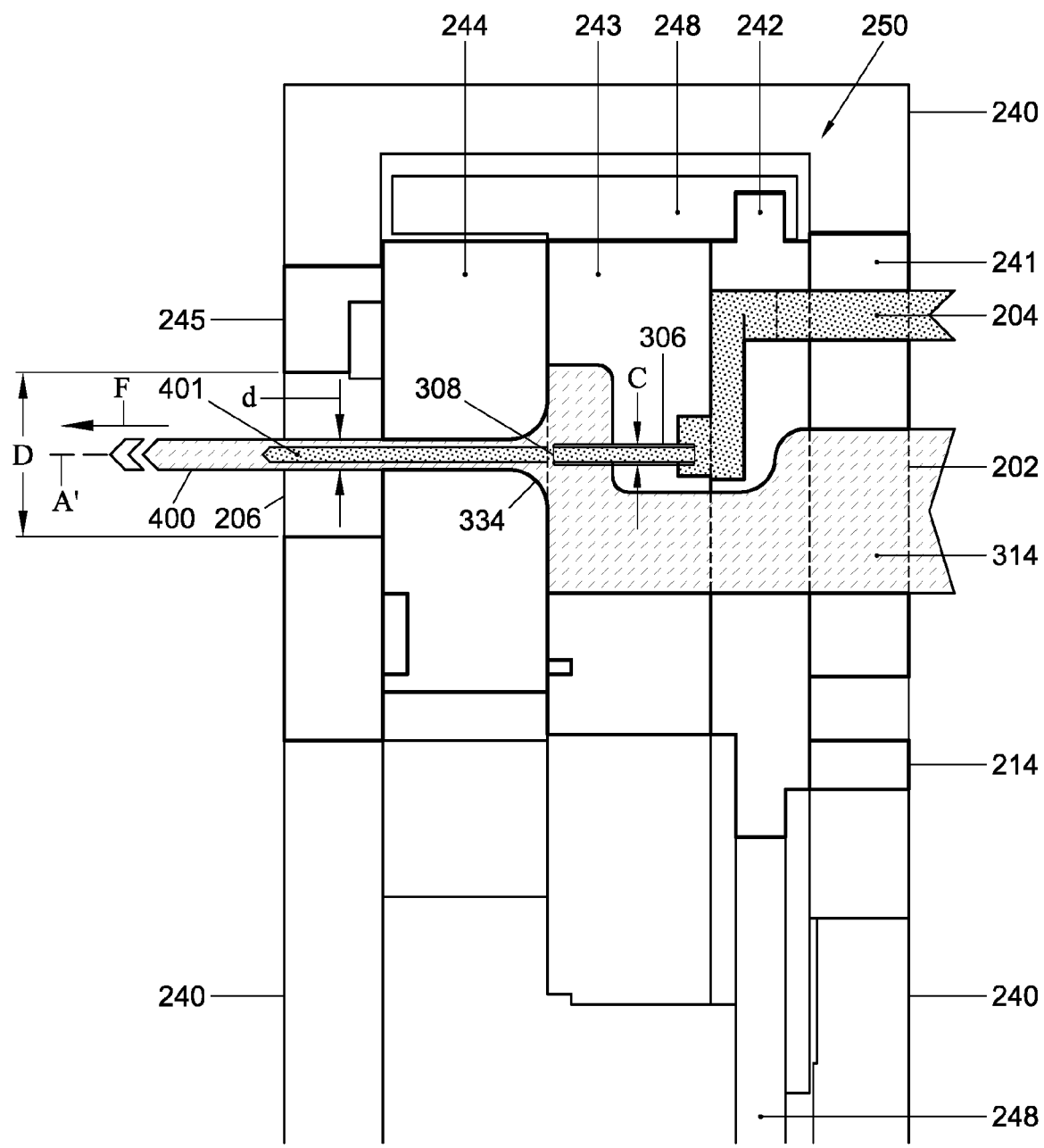
FIG. 12 shows a side plan view of a selection valve provided in a beverage preparation machine in a first functional position.

In FIG. 12 the length L2 of a portion of the needle extending along the axial direction of the liquid flow path coaxially with the liquid flow is 4 mm.

It will be appreciated that this example of the liquid flow path 14 arranged for generating a hollow jet of liquid may be advantageously integrated into a selection valve 201. Such a multi-functional valve reduces the number of valves needed in the beverage preparation device.

Figure 11:
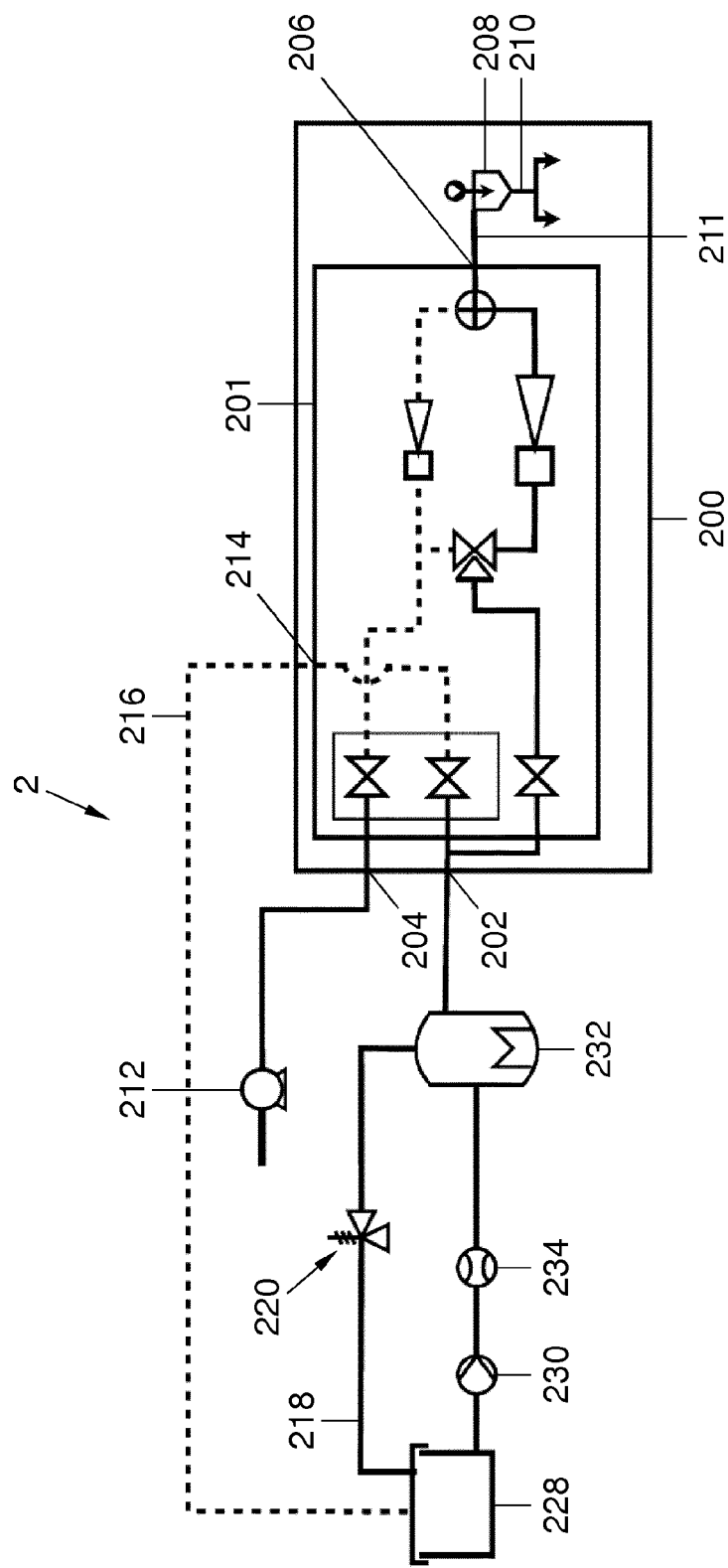
FIG. 11 shows a schematic diagram of a beverage preparation device of a system according to the invention.

FIG. 11 shows a schematic diagram of an example of a beverage preparation device of a system according to the invention. It will be appreciated that a selection valve 201 and a mixing chamber 208 may form a beverage preparation unit 200. A beverage preparation device, such as the one schematically depicted in FIG. 11, may be provided with a plurality of beverage preparation units 200. The unit is preferably arranged to cooperate with an exchangeable supply pack, for example when the exchangeable supply pack is connected with the beverage preparation unit, an outlet of the doser is brought in fluid communication with the mixing chamber. The unit may also include a doser interface for interacting with a supply pack for dosing beverage related ingredient into the mixing chamber. Additionally, the unit may include an actuator, such as a stepper motor, for controlling the selection valve 201.

In FIG. 11, the inputs and output of the selector valve 201 are shown. Hot water inlet 202 is connected to the water heater 32 which is in turn is connected to a water flow meter 234, a water pump 230 and a water reservoir 228. The air pump 212 is connected via air inlet 204 to the selection valve 201. Outlet 206 of the valve 201 is connected to the mixing chamber 208 via a connection line 211. The selection valve 201 also has a bypass outlet 214 which is connected to the water reservoir 228 via a bypass connection line 216. It is noted that the water heater 232 is connected to the water reservoir 228 by a pressure relief valve 220 and connection line 218. It will be appreciated that a supply pack of a type as discussed for the other embodiments can be connected with the mixing chamber 208 on top of the mixing chamber. Although not depicted in FIG. 11, the beverage preparation device 2 may include a doser driving interface for interacting with the supply pack to dose beverage related ingredient into the mixing chamber 208. An example of a doser has been discussed for the other embodiments. The mixing chamber 208 also has a beverage outlet 210.

A side plan view of the selection valve 201 is shown in FIG. 12. The valve 201 includes five ceramic elements 241-245. Elements 241 and 245 are fixed within a valve body 240. The valve body 240 is shown schematically in FIG. 12. Element 241 includes the hot water inlet 202, air inlet 204, and bypass outlet 214. Element 245 includes the outlet 206. A selector member 250, which is movably mounted with respect to the valve body 240, is formed by elements 242 and 243 mounted within an arm 248. The selector member 250 is driven, in this this example, by a stepper motor. In this example the selector member 250 is slidably mounted with respect to the valve body 240.

Element 244 is a satellite element associated with the selector member 250. The satellite element, element 244, has a predefined limited amount of free relative movement with respect to the selector member for allowing the satellite element 244 to be positioned independently of the selector member. In this way, the valve may be placed in different functional positions by the driving the selector member 250. Schematic perspective views of the different functional positions of the valve 201 are shown in FIGS. 13A-13E. Thus the selector member 250 and the satellite element 244 are movable in a plane substantially perpendicular to axial direction A', and preferably rotatable in the plane. The elements slide over each other.

The configuration for generating a hollow jet to be injected into the mixing chamber, as for example depicted in FIG. 10, may be integrated into the valve 201. The functional position of valve 201 shown in FIG. 12 generates a hollow jet to be injected into the mixing chamber 208. The liquid flow path 314, formed through the five elements 241-245, includes a first nozzle 334 located in element 244.

Figure 13A:
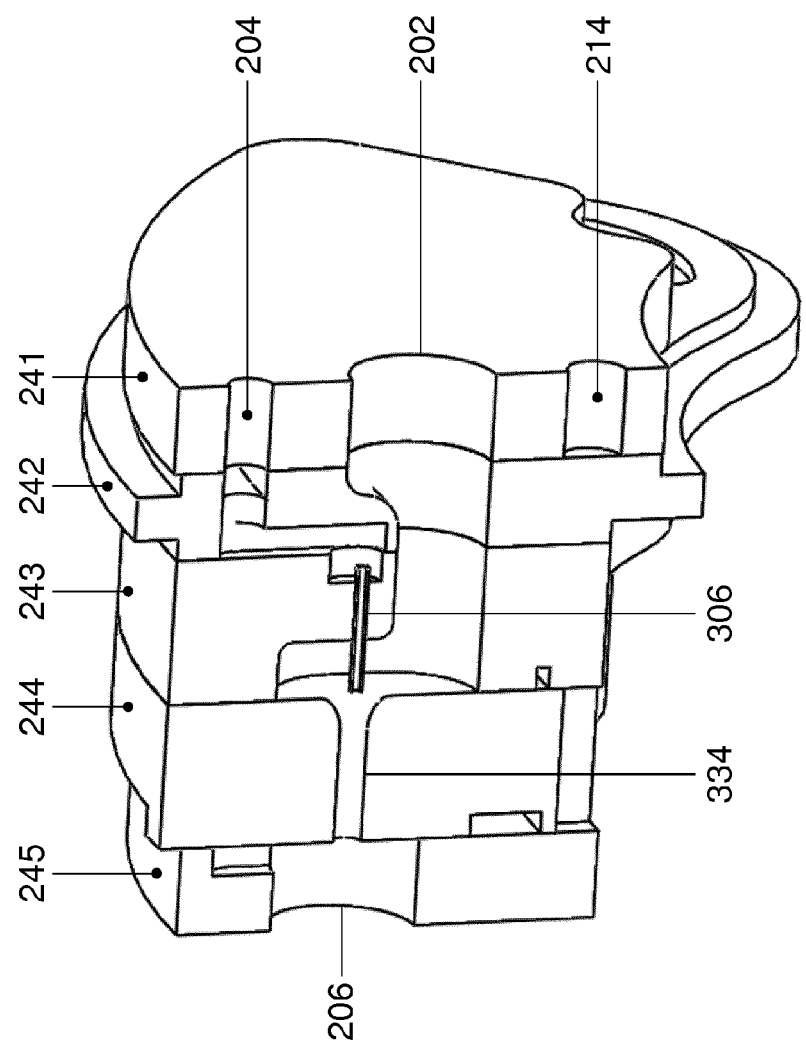
FIGS. 13A-13E show perspective views of the different functional positions of the valve shown in FIG. 12.

In this example the nozzle 334 has a tapered geometry wherein over the flow direction of the nozzle, the opening of the nozzle decreases exponentially as shown in FIG. 13A. This allows for a suitable hollow jet to be formed with at a relatively low water pressure, for example a water pressure of 1.5-1.7 bar and preferably a water pressure of 1.3-1.4 bar. This may permit the size and/or cost of the water pump to be reduced. Reducing the water pressure needed for form a suitable jet also reduces the pressure applied to elements 241-245. Thus in turn the power needed to drive the selector member 250 is also reduced. This may allow a smaller stepper motor to be used from operating the valve 201.

The air supply means in this example are active and include air injection means. As shown in FIG. 11, air inlet 204 is connected to air pump 212. The air supply means further comprise a needle 306 having an open end 308. The needle is provided in element 243 of the selector member 250. The needle has an inner diameter of 0.26 mm and an outer diameter C of 0.46 mm. In this embodiment, the needle 306 lays upstream of the nozzle 334. In this way the flow of air (which may for example be also described as an jet of air) can penetrate into and displace the liquid flow downstream of the nozzle 334 so that a hollow jet is formed. Surrounding the needle 306, a flow of pressurized water is created. The air pump 212 is a diaphragm pump and is arranged to keeps the needle 306 under a constant overpressure of 0.2-0.3 bar. The prevents water from entering the air supply means.

As can be seen in FIG. 12, the axial direction of the needle 306 and an the axial direction of the nozzle 334 and thus the axial direction A' of the jet at least substantially coincide. In this example, the open end 308 of the needle is centered in the axial extent of the nozzle 334. In this way the flow of air is injected into the center of the jet, in other words air is injected substantially coaxially in the jet. The flow direction of the jet is the same as the flow direction of the flow of air so as to obtain the hollow jet. This configuration takes care to create a straight beam, i.e. not divergent and not converging.

Thus the liquid flow path 314 is arranged for generating a hollow jet of liquid having an outer liquid portion 400 extending in a flow direction, F, of the jet and an inner air portion 401 extending in a flow direction, F, of the jet wherein the outer liquid portion 400 surrounds the inner air portion 401. In this way the hollow jet has the form of a straw wherein the inner side of the straw represents the inner air portion 401 of the jet and the straw itself represents the outer liquid portion of the jet 400. Thus the hollow jet in fact is a combination of an jet of air and a hollow jet of liquid which surrounds the jet of air. The air is protected from the under-pressure in the channel by the water jet. The flow direction of the jet of air and the flow direction of the hollow jet of liquid is the same direction F. The hollow jet exits through outlet 206 of the valve 201. The outlet 206 of valve 201 has a larger diameter D, in this example 5 mm, than the diameter d of the hollow jet, in this example approximately 0.95 mm. In this way the hollow jet does not contact the inner surface of connection line 211 connecting the outlet 206 to the mixing chamber 208.

In this example, the additional air valve for selectively generating a stream of air that is supplied to the needle 306 is incorporated into the valve 250. This function is incorporated into the valve 250 through the relative positions of the selector element 250 and the fixed element 241 (see FIGS. 13B-13E). In this functional positions, the element 243 and thus needle 306 is no longer in the liquid flow path 314.

In FIGS. 13A-13E, the valve body 240 and arm 248 have been omitted for clarity in order to show the different functional positions. In these positions different inlets and outlets are brought in fluid communication with each other. In FIG. 13A, a perspective view of the selection valve 201 in the functional position for generating a hollow jet is shown. In this position, both the hot water inlet 202 and air inlet 204 are in fluid communication with the outlet 206. This position is ideal for producing foamed beverages, for example coffee with a layer of crema.

Figure 13B:
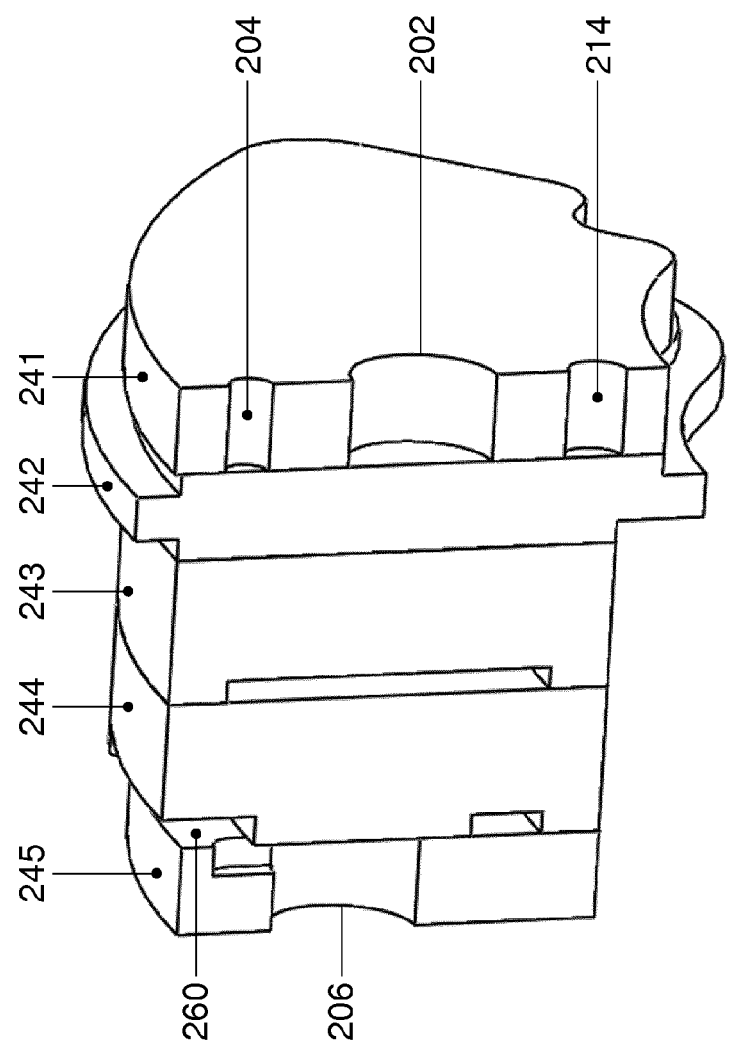

In FIG. 13B, the valve is in a closed off but vented position. Neither the hot water inlet 202 nor the air inlet 204 are in fluid communication with the outlet 206. Flow from these inlets is blocked by element 242 which has been moved relatively to element 241. The outlet 206 is however in this position vented through vent 260 provided in element 244. In this position, due to the vent, the mixing chamber drains itself.

Figure 13C:
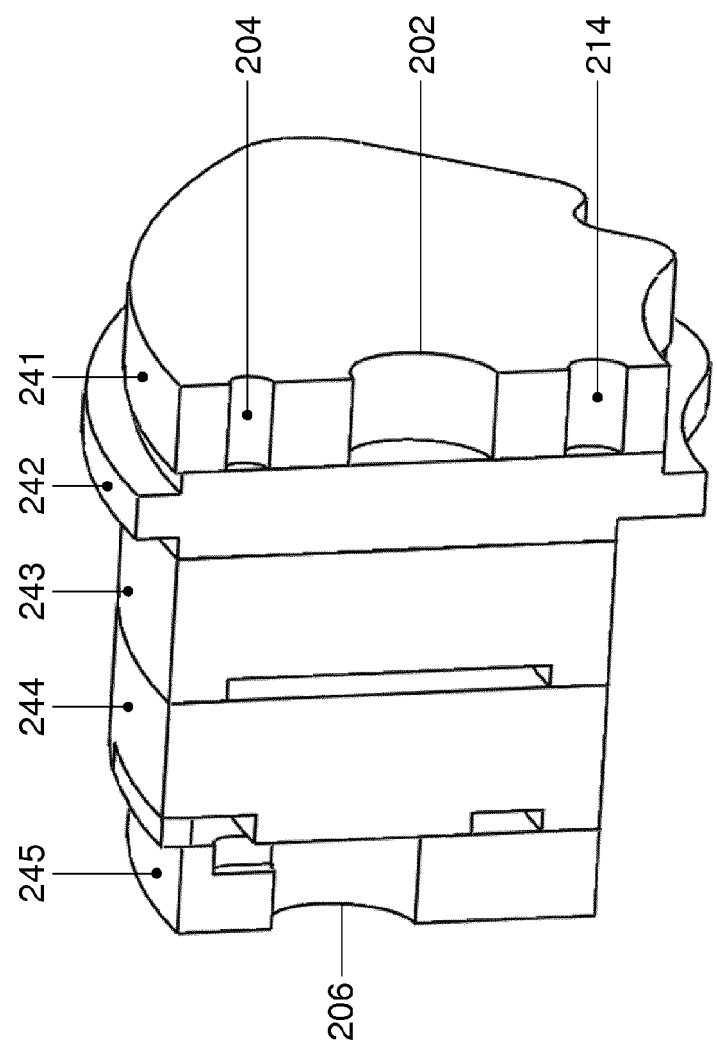

In FIG. 13C, the valve closed off. In this functional position, which is similar to the position shown in FIG. 13B, the neither the hot water inlet 202 nor the air inlet 204 are in fluid communication with the outlet 206. Both are blocked by the element 242 which has been moved relatively to element 241. In this position, the outlet 206 is not vented. Such a position is useful when a plurality of valves and mixing chambers are used. In an embodiment wherein a beverage preparation device is provided with a plurality of beverage preparation units, for example one unit for a coffee related beverage ingredient and another unit for a milk related beverage ingredient, the functional position shown in FIG. 13C is useful. When the valve 201 of the beverage preparation unit is in the closed position the water pressure of the device may be maintained.

Figure 13D:
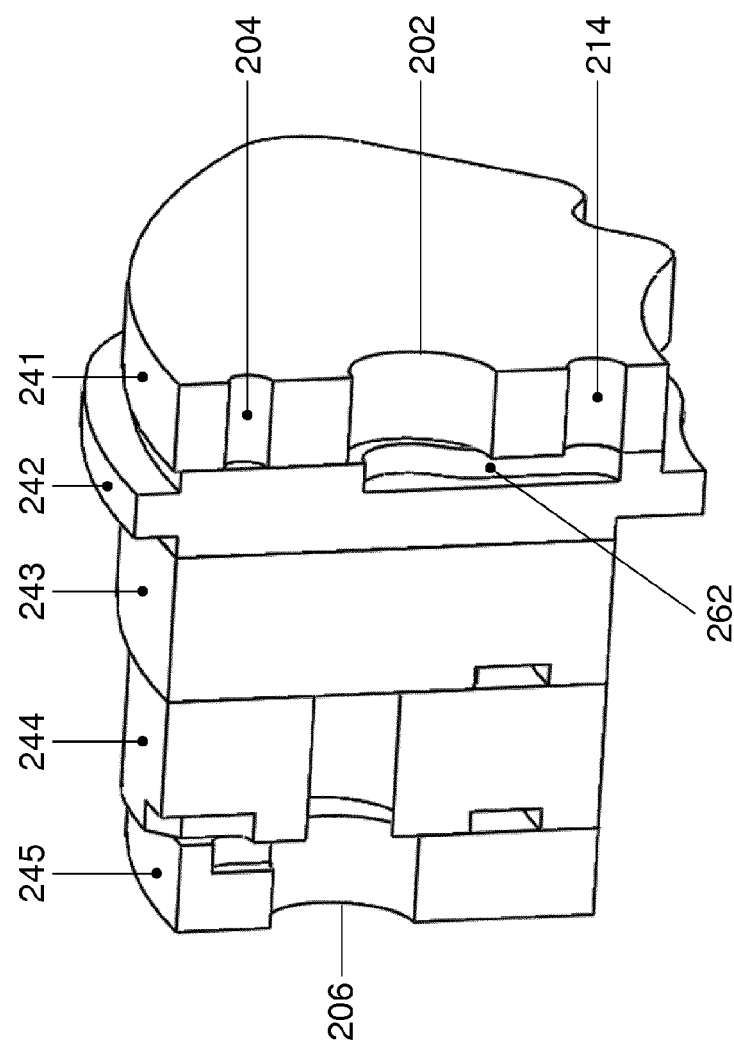

In FIG. 13D, a perspective view of the selection valve 201 in a bypass position is shown. In this functional position, the air flow is from air inlet 206 is blocked off by element 242. Hot water inlet 202 is in fluid communication with bypass outlet 214 via a channel 262 provided in element 242. This position is useful for preventing boiler pressure buildup and to allow removal of air from the boiler at the beginning of the drink production process.

Figure 13E:
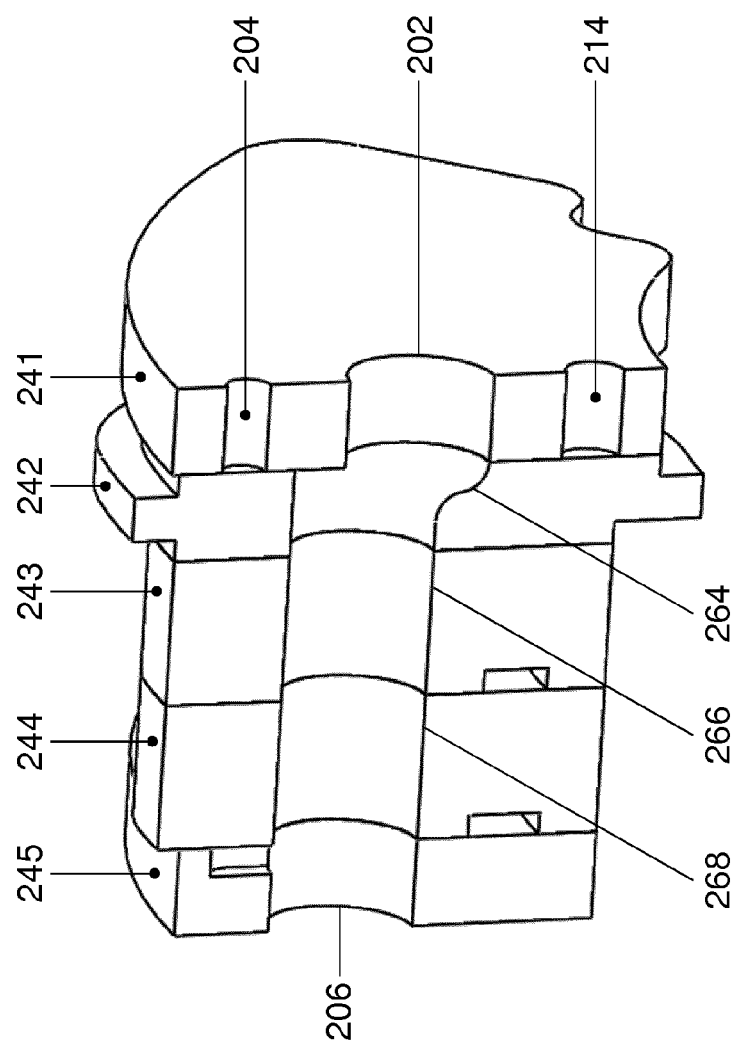

In FIG. 13E air flow at air inlet 204 is blocked by element 242. The flow to the bypass outlet 214 is also blocked by element 242. The hot water inlet 202 is brought in fluid communication with the outlet 206 by openings 264, 266, and 268 in elements 242, 243, and 244 respectively. These openings 264, 266, and 268 have substantially the same diameter as that of outlet 206. Thus a channel with a diameter of approximately 5 mm is formed by the relative positions of the elements connecting the hot water inlet 202 to the outlet 206. This functional position is ideal for producing foamless beverages, such as brewed coffee.

It will be appreciated that when element 243 is positioned relative to the other elements such that needle 306 is not in the liquid flow path 314 the needle is protected. It is further noted that relative movement of element 244 with respect to elements 243 and/or 245 may help remove limestone deposit built up on the needle 306 and/or opening 266 of element 243 as well as limestone deposit built up on the nozzle 334 and/or opening 268 of element 244.

Figure 14:
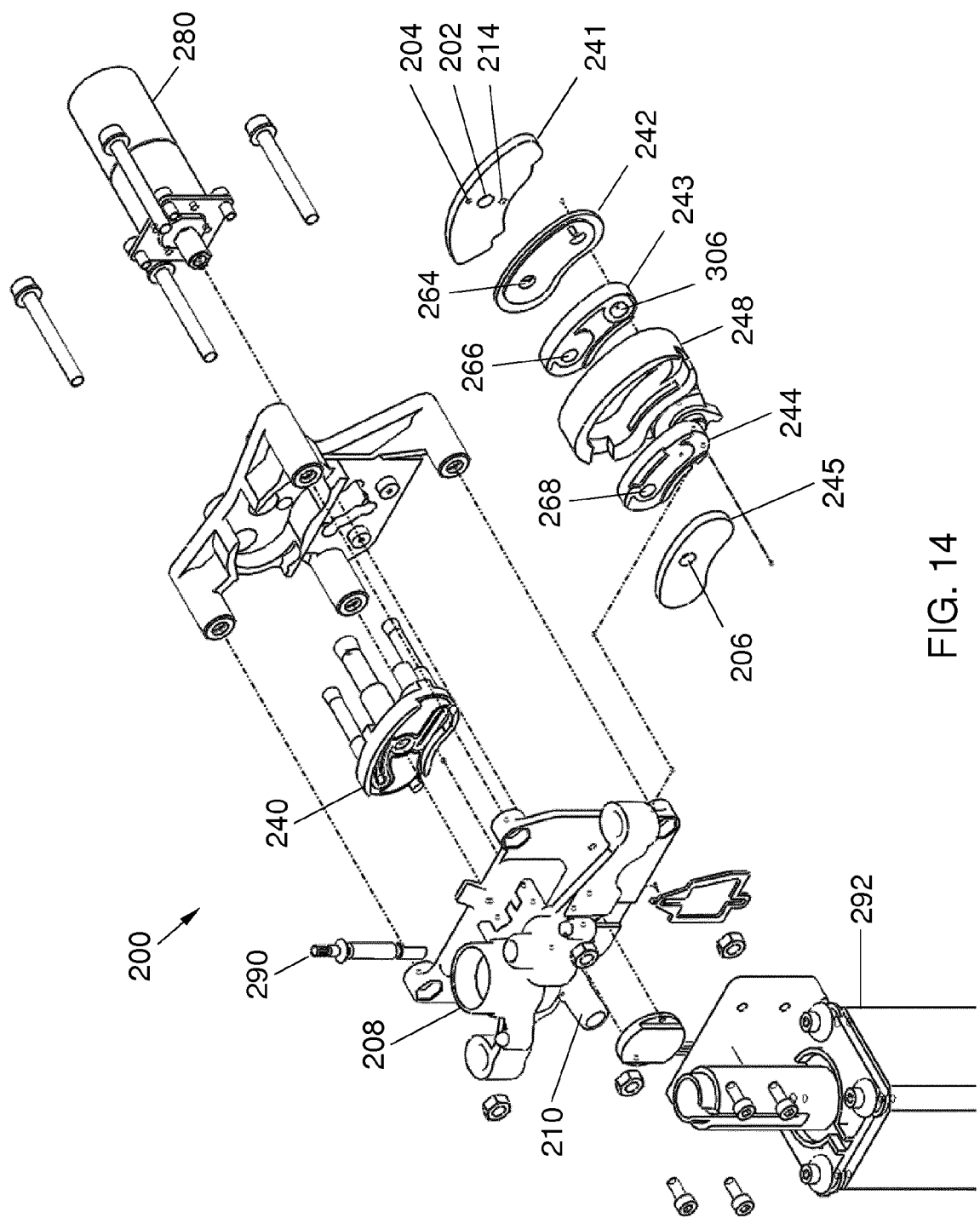
FIG. 14 shows an exploded perspective view of a beverage preparation unit according to the invention.

An example of a beverage preparation unit is shown in FIG. 14. The beverage preparation unit 200 shown in FIG. 14 includes a selection valve 201 and mixing chamber 208. In addition, unit 200 also includes a stepper motor 280 for controlling the selection valve 201 between the different functional positions. The unit 200, in this example, is further provided with a doser interface, drive shaft 290. The doser interface is driven by stepper motor 292. The doser interface is arranged to interact with an exchangeable supply pack as described with regard to the other examples. The doser interface, in this example drive shaft 290, may be mechanically connectable with a doser of an exchangeable supply pack. The at least one exchangeable supply pack includes a container for holding a beverage related ingredient, and a doser outlet. The doser is arranged for supplying the beverage related ingredient from the container to the outlet of the doser in a dosed manner. When the exchangeable supply pack is connected to the beverage preparation unit 200, the outlet of the doser is brought in fluid communication with the mixing chamber, preferably via an opening in the top of the mixing chamber 208. When the drive shaft 290 of the beverage preparation device is beverage related ingredient is supplied from the outlet of the doser into the mixing chamber. The mixing chamber 208 is provided with outlet 210.

It will be understood that the beverage preparation machine shown in FIG. 11 may be operated in a similar manner as described for other embodiments of the invention. Furthermore it will be appreciated that the beverage preparation unit provided in the beverage preparation device shown in FIG. 11 may be arranged to cooperate with an exchangeable supply pack.

Figure 15:
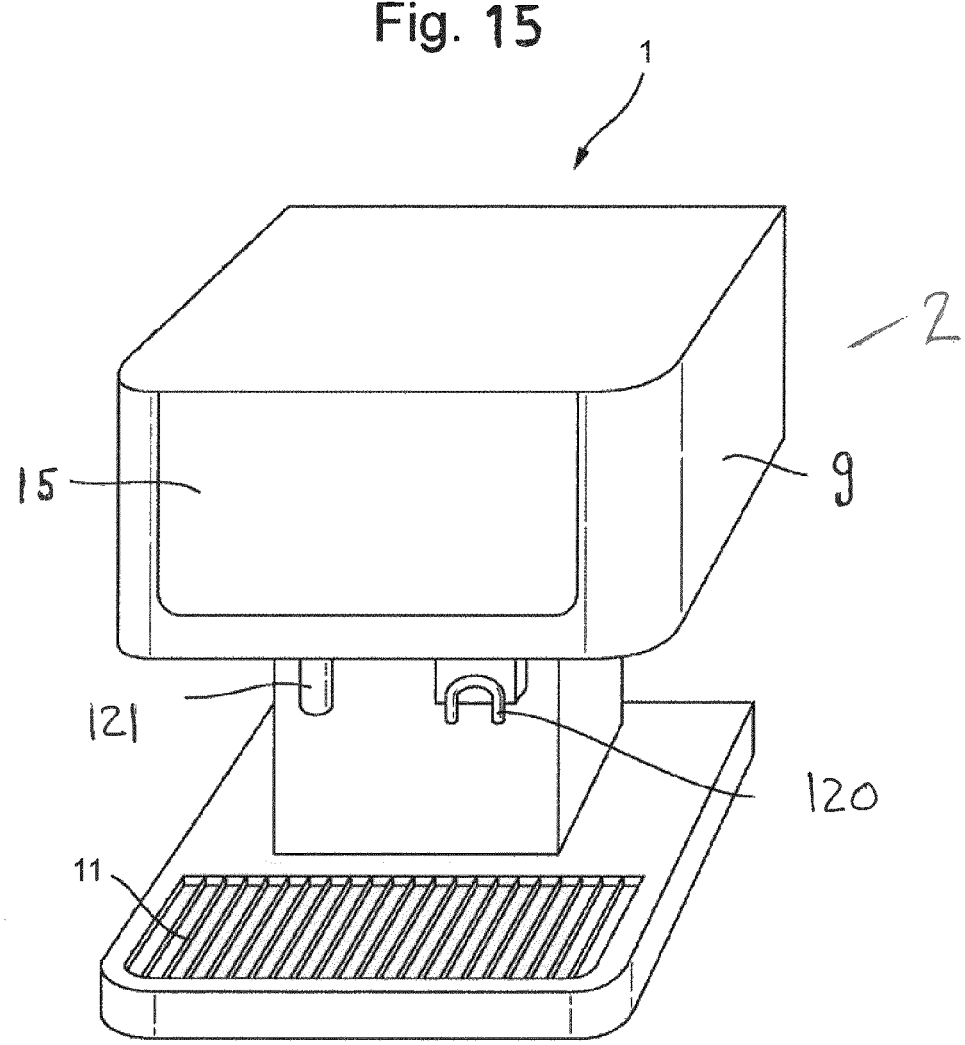
FIG. 15 shows a perspective view of a beverage preparation device for preparing beverage consumptions in accordance with the invention.

The system 1 comprises a beverage preparation device 2, which in turn comprises a beverage preparation unit for example, unit 200. As shown in FIG. 15, the beverage device 2 includes an exchangeable supply pack compartment for receiving an exchangeable supply pack with beverage related ingredients. The compartment is closed by a front hatch 15, which can be opened to give access to the compartment. The beverage preparation device 2 further comprises a housing 9. Additionally, the beverage preparation device 2 may be further provided with a drip tray 11. The drip tray may be provided in a pedestal of the device 2. Apart from the features described herein above, the device 2 includes at least one mixing chamber 8 for mixing, e.g., concentrated liquid coffee or milk ingredients with hot water for dispensing through either a coffee outlet 120 or a milk outlet 121.

An example beverage cycle for producing will now be described. During a beverage cycle, the beverage preparation device 2 is arranged for activating the liquid supply means 12 for a first period of time and for activating the drive shaft 20 for a second period of time for supplying concentrate to the mixing chamber 8. In this example the first and second period are continuous. In other words the liquid supply means 12 is activated for the entire first period, and the drive shaft 20 is activated for the entire second period.

In this example, the liquid supply means 12 are activated before the drive shaft 20. The second period starts 0.25 seconds after the first period. In the first period, the liquid supply means 12 supplies water to the mixing chamber on average with 10 ml/sec. The second nozzle 38 generates a jet of liquid having a stable speed of 14 m/sec. Therefore the device doses liquid in the form of a jet having an average speed of V. In this example V is 14 m/sec. As the device doses liquid into the mixing chamber with Q ml/sec, the speed of the jet is Q/E m/sec. E is the cross-surface area of the liquid of the jet in mm$^2$. In this example, E is 0.714 mm$^2$. At the beginning of the first period, the first air supply valve 44 is opened. Therefore when the substantially solid jet impacts the first nozzle 34 in the impact zone 48 and is directed outwardly, air in the intermediate portion 40 is sucked in through the air duct 42 and one way valve 60 as the hollow jet is formed. The hollow jet spouts into the mixing chamber 8 via the inlet 16 in the sidewall 36 of the mixing chamber creating a swirl. During the first period the device doses Z ml of liquid, in this example Z is 104.4 ml of liquid, for the one beverage, into the mixing chamber. The first period lasts 10.4 seconds. Therefore the device doses liquid to the mixing chamber for the preparation of one beverage during G seconds, and in this example G is 10.4.

At the start of the second period the drive shaft 20 is activated. After a ramp up phase, the drive shaft 20 rotates at substantially X RPMs, in this example X is 190 revolutions per minute. The drive shaft transmits 0.25 Nm of torque to the gear pump of the doser 6. As the gear pump begins to rotate, concentrate is pumped towards the outlet 22 of the doser 6. The bias of the one way valve 24 is over come and concentrate is supplied to the mixing chamber 8 via the opening 26 with the help of gravity. The doser, in this example, is arranged for dosing 0.198 ml per drive shaft revolution. Therefore when the drive shaft rotates at X revolutions per minute, the doser doses the beverage related ingredient on average with C*X/60 ml/sec. In this example, X is 190 RPM and C is 0.198 ml/rev, and therefore the doser doses the beverage related ingredient on average with (0.198 ml/rev*190 RPM)/60, or 0.62 ml/sec. Therefore the beverage preparation device doses liquid is dosed to the mixing chamber on average with Q ml/sec, in this example 10 ml/sec, and the system doses ingredient for the preparation of the one beverage, on average with R ml/sec. In this example R is 0.62 ml/sec, as calculated above.

The second period lasts approximately 9.2 seconds. During the second period 5.7 ml of concentrate are supplied to the mixing chamber 8. Therefore the device doses Z ml of liquid for one beverage into the mixing chamber, and the system doses Y ml of beverage related ingredient into the mixing chamber for the preparation of the one beverage. In this example, Z is 104.4 ml and Y is 5.7 ml.

Therefore when the device doses Z ml of liquid into the mixing chamber for the one beverage, the system doses D*Z ml of beverage related ingredient into the mixing chamber for the preparation of one beverage. In this example, Z is 104.4 ml of liquid and D is 0.0555. This relationship produces a beverage with the desired strength and flavor. Additionally, as noted above, in the first period, the liquid supply means 12 supplies water to the mixing chamber on average with 10 ml/sec. Therefore the device doses liquid to the mixing chamber on average with Q ml/sec, in this example 10 ml/sec, and the system doses beverage related ingredient on average with F*Q ml/sec. In this example, the doser doses the beverage related ingredient on average with 0.198 ml/rev*190 rmp, or 0.62 ml/sec, therefore, in this example, F is 0.062. This relationship between the flow rates of the water and concentrate produces a beverage with the desired strength and flavor.

In this example of a beverage cycle, the first air supply valve 44 is closed part way through the first and second period. This is necessary in order to control the amount of air entering the mixing chamber 8 and in turn to control the resulting foam layer.

The first period of activation of the liquid supply means 12 lasts 10.4 seconds. Therefore the first and second period substantially overlap. In other words water and concentrate are supplied simultaneously. However, the second period ends 0.95 second before the first period ends. In this way, the liquid supply means 12 are active 0.95 seconds longer than the drive shaft 20. This helps reduce mixture residue in the mixing chamber. In this 0.95 seconds, at the end of the beverage cycle, approximately, 10 ml of water is supplied to the mixing chamber 8 by the liquid supply means 12. As the mixing chamber has a volume of approximately 4.5 ml this causes the mixing chamber 8 to fill with swirling water. Due to the outwardly extending sidewall 36 towards the top of the mixing chamber swirling water contacts the underside of the outlet 22 of the doser 6 and the one way valve of the doser 24. This helps rinse away any concentrate present on these components. The water than leaves the mixing chamber 8 through the outlet 10.

During this rinse, the first air supply valve 44 is open, and the flushing means 58 are activated. The first air supply valve 44 is opened 1.5 seconds before the liquid supply means 12 are deactivated, and the flushing means are activated 0.5 seconds the liquid supply means 12 are deactivated. The flushing means remain active for 1.5 seconds.

When the flush valve is opened, flush fluid, in this example water, is supplied to the air duct 42 downstream from the one way valve 60. The flush fluid, in this example water, flows through the air duct 42, into the liquid flow path 14, enters the mixing chamber 8, and exits via the outlet 10.

When the first air valve 44 is closed, the air pump 54 is activated and the second air valve 56 is opened. Air is forced through the air duct 42 and a portion of the liquid flow path 14. This helps dry out the air duct 42 and the intermediate portion 40 and the first nozzle 34. This reduces the amount of mixture residue in the liquid flow path. After 2 seconds the air pump 54 is deactivated and the second air valve 56 is closed. This concludes the beverage cycle. In this example, the resulting beverage consumption has a drink volume of approximately 110 ml.

It will be appreciated that the above beverage cycle is an example, and than many different beverage cycles may be envisioned. It is believed that the operation and construction of the present invention will be apparent from the foregoing description. For the purpose of clarity and a concise description features are described herein as part of the same or separate embodiments, however, it will be appreciated that the scope of the invention may include embodiments having combinations of all or some of the features described. To the skilled person in this field of the art it will be clear that the invention is not limited to the embodiment represented and described here, but that within the framework of the appended claims a large number of variants are possible. Also kinematic inversions are considered inherently disclosed and to be within the scope of the present invention. The terms comprising and including when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A beverage preparation unit for preparing beverage consumptions using a beverage related ingredient;
    wherein the beverage preparation unit comprises a mixing chamber having a beverage outlet, a liquid flow path for supplying a liquid to the mixing chamber, and an air flow path for supplying air to the liquid flow path;
    wherein the mixing chamber is arranged for receiving a beverage related ingredient; and
    wherein the liquid flow path is arranged for generating a hollow jet of liquid having an outer liquid portion extending in a flow direction of the jet and an inner air portion extending in a flow direction of the jet wherein the outer liquid portion surrounds the inner air portion; and
    wherein the liquid flow path extends in an axial direction, wherein the unit is further provided with air injection means for generating a flow of air which extends in the axial direction and for injecting the flow of air coaxially in a flow of liquid in the liquid flow path wherein the flow direction of the flow of liquid in the liquid flow path is the same as the flow direction of the flow of air so as to obtain the hollow jet.

2. The unit according to claim 1, wherein the liquid flow path includes a first nozzle.

3. The unit according to claim 1, wherein the injection means comprises a needle having an open end wherein an axial direction of the needle and an axial direction of the jet coincide.

4. The unit according to claim 3 wherein the open end of the needle is located near the first nozzle wherein the needle extends from the open end in a direction opposite to the flow direction of the jet.

5. The unit according to claim 3 wherein the open end of the needle is located in the nozzle, stream upwards of the nozzle or stream downwards of the nozzle.

6. The unit according to claim 2, wherein the first nozzle is arranged for generating a jet of liquid in an axial direction, and wherein the liquid flow path includes air injection means for injecting a stream of air towards a center of the jet of liquid in a direction coaxial with the axial direction of the jet of liquid such that a hollow jet is formed.

7. The unit according to claim 6, wherein the air injection means include a pipe extending into the first nozzle, wherein the pipe is coaxial with the first nozzle, and wherein the air injection means is arranged for injecting air into the jet of liquid generated by the first nozzle through the pipe.

8. The unit according to claim 1, wherein the air injection means is arranged to be in fluid communication with an air pump.

9. The unit according to claim 3, wherein the liquid flow path includes a selection valve comprising a valve body, a liquid inlet arranged to be in fluid communication with a liquid supply means, an air inlet arranged to be in fluid communication with an air injection means, and at least a first outlet in fluid communication with the mixing chamber, wherein the selection valve further comprises a selector member including the needle, wherein the selector member is movably mounted with respect to the valve body for movement from a first position in which the liquid inlet is in fluid communication with the at least first outlet, and wherein the air inlet is in fluid communication with the at least first outlet via the needle of the selector member.

10. The unit according to claim 9, wherein the valve further includes a satellite element including the first nozzle, wherein the satellite member is associated with the selector member, and wherein the satellite element has a predefined limited amount of free relative movement with respect to the selector member for allowing the satellite element to be position independently of the selector member, and wherein in the first position the liquid inlet and air inlet are in fluid communication through a fluid flow path including the first nozzle of the satellite member.

11. The unit according to claim 2, wherein the first nozzle terminates at a side wall of the mixing chamber, and wherein the outer liquid portion of the hollow jet contacts a portion of an inner surface of the first nozzle in an area adjacent to the mixing chamber.

12. The unit according to claim 2, wherein the air flow path comprises an air supply duct in fluid communication with the liquid flow path and located upstream from the first nozzle.

13. The unit according to claim 12, wherein the air flow path comprises a first air supply valve arranged for selectively connecting the air supply duct to an air supply.

14. The unit according to claim 12, wherein the air flow path further comprises an air pump arranged for actively supplying air to the liquid flow path via the air supply duct.

15. The unit according to claim 14, wherein the air flow path further comprises a second air supply valve arranged for selectively connecting the air pump to the air supply duct.

16. The unit according to claim 15, wherein the beverage preparation device is arranged for activating the air pump and opening the second air valve when activating the drive shaft.

17. The unit according to claim 12, wherein the air supply duct includes a one way valve arranged to prevent liquid from traveling along the air supply duct.

18. A beverage preparation device for preparing beverage consumptions, the device comprising:
a beverage preparation unit,
wherein the beverage preparation unit comprises a mixing chamber having a beverage outlet, a liquid flow path for supplying a liquid to the mixing chamber, and an air flow path for supplying air to the liquid flow path;
wherein the mixing chamber is arranged for receiving a beverage related ingredient, such as concentrate, preferably from an exchangeable supply pack; and
wherein the liquid flow path is arranged for generating a hollow jet of liquid having an outer liquid portion extending in a flow direction of the jet and an inner air portion extending in a flow direction of the jet wherein the outer liquid portion surrounds the inner air portion;
wherein the liquid flow path extends in an axial direction, wherein the unit is further provided with air injection means for generating a flow of air which extends in the axial direction and for injecting the flow of air coaxially in a flow of liquid in the liquid flow path wherein the flow direction of the flow of liquid in the liquid flow path is the same as the flow direction of the flow of air so as to obtain the hollow jet;
liquid supply means including the liquid flow path for supplying a liquid to the mixing chamber; and
air supply means for supplying air to the liquid flow path.

19. The beverage preparation device according to claim 18, wherein the beverage preparation device further comprises an exchangeable supply pack compartment for receiving an exchangeable supply pack with beverage related ingredients.

20. A system for preparing beverage consumptions, the system comprising:
a beverage preparation device according to claim 18;
at least one exchangeable supply pack arranged for holding a beverage related ingredient;
wherein the beverage preparation device further comprises a closer interface;
wherein the at least one exchangeable supply pack includes a container for holding a beverage related ingredient, and a closer having an outlet, wherein the closer is arranged for supplying the beverage related ingredient from the container to the outlet of the closer in a dosed manner;
wherein the at least one exchangeable supply pack and the beverage preparation device are mechanically connectable, and wherein when connected the outlet of the closer is brought in fluid communication with the mixing chamber and the closer interface is arranged for activating the closer for supplying beverage related ingredient from the outlet of the closer into the mixing chamber.

21. A combination of a beverage preparation unit according to claim 1 and an air pump, wherein air flow path of the unit is arranged to be in fluid communication with the air pump.

22. A combination of a beverage preparation unit according to claim 1 and a liquid pump, wherein the liquid flow path of the unit is arranged to be in fluid communication with the liquid pump.

23. The unit according to claim 1, wherein the mixing chamber is arranged for receiving a concentrate.

24. The unit according to claim 23, wherein the concentrate is from an exchangeable supply pack.

25. The unit according to claim 13, wherein the air supply is atmosphere.

26. The beverage preparation device according to claim 19, wherein the exchangeable supply pack compartment is closed by an openable hatch.

27. The combination of a beverage preparation unit and an air pump of claim 21, wherein the air pump is arranged for supplying air to the air flow path at a pressure in the range of 0.05 bar-10 bar.

28. The combination of a beverage preparation unit and an air pump of claim 21, wherein the air pump is arranged for supplying air to the air flow path at a pressure in the range of 0.1 bar-0.3 bar.

29. The combination of a beverage preparation unit and an air pump of claim 21, wherein the air pump is arranged for supplying air to the air flow path at a pressure in the range of 0.1 bar-0.2 bar.

30. A combination of a beverage preparation unit and a liquid pump according to claim 22, wherein the liquid pump is a water pump.

31. A combination of a beverage preparation unit and a liquid pump according to claim 22, wherein the liquid pump is arranged for supplying liquid to the liquid flow path at a pressure in the range of 0.5 bar-15 bar.

32. A combination of a beverage preparation unit and a liquid pump according to claim 22, wherein the liquid pump is arranged for supplying liquid to the liquid flow path at a pressure in the range of 1 bar-7 bar.

33. A combination of a beverage preparation unit and a liquid pump according to claim 22, wherein the liquid pump is arranged for supplying liquid to the liquid flow path at a pressure in the range of 1.5 bar-3 bar.

* * * * *